US011853082B1

(12) United States Patent
McEwan et al.

(10) Patent No.: US 11,853,082 B1
(45) Date of Patent: Dec. 26, 2023

(54) CONTROL OF VEHICLE MOVEMENT BY APPLICATION OF GEOMETRIC ALGEBRA AND STATE AND ERROR ESTIMATION

(71) Applicant: Digital Aerolus, Inc., Lenexa, KS (US)

(72) Inventors: Ian J. McEwan, Pasadena, CA (US); Thomas D. Williams, Shutesbury, MA (US); Jeffery J. Alholm, Kansas City, MO (US); John C. Blessing, Kansas City, KS (US); Jacob B. Davisson, Lawrence, KS (US); Frank C. Glazer, Amherst, MA (US); Jay D. Manifold, Kansas City, MO (US); Laurence R. Williams, Sunderland, MA (US)

(73) Assignee: Digital Aerolus, Inc., Lenexa, KS (US)

( * ) Notice: Subject to any disclaimer, the term of this patent is extended or adjusted under 35 U.S.C. 154(b) by 16 days.

(21) Appl. No.: 17/677,391

(22) Filed: Feb. 22, 2022

Related U.S. Application Data

(63) Continuation of application No. 17/550,697, filed on Dec. 14, 2021, now abandoned, which is a
(Continued)

(51) Int. Cl.
*G05D 1/10* (2006.01)
*G05D 1/08* (2006.01)
(Continued)

(52) U.S. Cl.
CPC .......... *G05D 1/101* (2013.01); *B64C 39/024* (2013.01); *G01C 21/18* (2013.01); *G05D 1/0825* (2013.01);
(Continued)

(58) Field of Classification Search
CPC .... G05D 1/101; G05D 1/0825; G05D 1/0858; B64C 39/024; G01C 21/18; B64U 2201/104
See application file for complete search history.

(56) References Cited

U.S. PATENT DOCUMENTS

2008/0077284 A1* 3/2008 Swope ................... G05D 1/106
701/4
2017/0269494 A1 9/2017 Yoshida et al.
(Continued)

*Primary Examiner* — Aaron L Troost
(74) *Attorney, Agent, or Firm* — Hovey Williams LLP; Scott R. Brown

(57) ABSTRACT

A method and system for controlling movement of a vehicle. Movement, orientation, and position data of the vehicle is collected. A model of kinematics of the vehicle and its environment is created and a Theory of World model is produced and updated. The model includes geometric algebra multivectors. Errors and noise are stored as geometrically meaningful first-class objects within the multivectors. Geometric algebra operations are used to manipulate the model during operation. Error and noise data are propagated and manipulated using geometric algebra operations to reflect measurement and processing errors or noise. The models are used in generation of control data with a primary intent of ensuring stability. Operations such as intersections are used to compare position, orientation, and movement of the vehicle against position, orientation, and movement of objects in its environment. System tasks include, but are not limited to, kinematics, inverse kinematics, collision avoidance, and dynamics.

25 Claims, 14 Drawing Sheets

Related U.S. Application Data continuation of application No. 17/168,289, filed on Feb. 5, 2021, which is a continuation of application No. 16/219,609, filed on Dec. 13, 2018, now Pat. No. 10,915,117.

(60) Provisional application No. 62/598,235, filed on Dec. 13, 2017.

(51) Int. Cl.
*B64C 39/02* (2023.01)
*G01C 21/08* (2006.01)
*G01C 21/18* (2006.01)

(52) U.S. Cl.
CPC ..... *G05D 1/0858* (2013.01); *B64U 2201/104* (2023.01)

(56) References Cited

U.S. PATENT DOCUMENTS

| | | |
|---|---|---|
| 2018/0136659 A1 | 5/2018 | Matloff |
| 2019/0161203 A1* | 5/2019 | Worsham, II .......... B64D 45/00 |

* cited by examiner

CONTROL OF VEHICLE MOVEMENT BY APPLICATION OF GEOMETRIC ALGEBRA AND STATE AND ERROR ESTIMATION

RELATED APPLICATIONS

This regular utility non-provisional patent application is a continuation and claims priority benefit with regard to all common subject matter of earlier-filed non-provisional U.S. patent application Ser. No. 17/550,697, filed Dec. 14, 2021, and titled "CONTROL OF VEHICLE MOVEMENT BY APPLICATION OF GEOMETRIC ALGEBRA AND STATE AND ERROR ESTIMATION". Application Ser. No. 17/550,697 claims priority benefit with regard to all common subject matter of earlier-filed non-provisional U.S. patent application Ser. No. 17/168,289, filed Feb. 5, 2021, and titled "CONTROL OF VEHICLE MOVEMENT BY APPLICATION OF GEOMETRIC ALGEBRA AND STATE AND ERROR ESTIMATION". Application Ser. No. 17/168,289 claims priority benefit with regard to all common subject matter of earlier-filed non-provisional U.S. patent application Ser. No. 16/219,609, filed on Dec. 13, 2018, and titled "CONTROL OF VEHICLE MOVEMENT BY APPLICATION OF GEOMETRIC ALGEBRA AND STATE AND ERROR ESTIMATION". Application Ser. No. 16/219,609 claims priority benefit with regard to all common subject matter of earlier-filed provisional U.S. Patent Application Ser. No. 62/598,235, filed on Dec. 13, 2017, and titled "CONTROL OF VEHICLE MOVEMENT BY APPLICATION OF GEOMETRIC ALGEBRA AND STATE AND ERROR ESTIMATION". The identified earlier-filed patent applications are hereby incorporated by reference in their entireties into the present application.

BACKGROUND

Control systems for vehicles are typically optimized considering the intended tasks of the vehicle as well as the environment in which the vehicle operates. In the past a driver or pilot controlled most, if not all, of the actuators that affect the movement of the vehicle. In the past, some classes of vehicles began to have semi-autonomous or autonomous functions. Examples of such automation are auto-pilots on ships and aircraft. Historically, many such systems have heavily relied on inherent stability of mechanical design elements such as the stability of a fixed wing aircraft when a proper throttle setting has been set by the pilot. In such cases, the control system will maintain certain parameters within an envelope. This may mean adjusting control surfaces slightly to maintain parameters such as heading and altitude. A simple Proportional-Integral-Derivative (PID) controller may be sufficient to maintain the parameters. In such circumstances, the error signal can typically be contained only within the controller and will not be shared with any external systems. A typical exception is that if the error exceeds a limit, then a failure indication may be shared with other systems. Even then the numeric error value likely will not be shared.

As technology has advanced, there are more systems being controlled that have little or no inherent stability in their mechanical design. Examples include systems such as missiles, traditional rotorcraft, and multi-copter designs. In some of these designs, the automatically controlled actuators are completely necessary for any stability. To explain further, a multi-copter design stays in the air due to the thrust and lift produced by its rotors. Those rotors are also varied in speed in order to control parameters such as attitude, altitude, speed, and translational movement. If the control system ceases function, then the multi-copter will immediately lose control and will fall. In such a situation the only forces acting on the multi-copter are gravity and drag.

Control systems currently exist for the vehicles of all of these types, but their mathematical models are commonly limited in various ways. One problem is that they may not maintain a consistent error or noise model throughout the control system. This means that there may be no estimate of the error and therefore the system may not even be able to indicate that it has failed. Furthermore, they may have no means of combining errors from different sources or to accumulate error over time. They may not be able to make decisions whether a given path is a safe path to take due to limited error estimation, if any.

Multi-copters which are commonly unmanned air vehicles, also called "drones," are limited in many commercial applications by inherent flaws in existing technology, primarily flight control software intended to stabilize the drone and make it respond to flight commands. This can be due to very limited mathematical models of the drone and its environment. These vehicles may not maintain a consistent error or noise model throughout the control system. This means that there may be no estimate of the error and therefore the system may not be able to indicate that it has failed. Furthermore, they may have no means of combining errors from different sources or to properly account for variations in error over time. They may not be able to make decisions about whether a given path is a safe path to take based on error information. Conventional drones do not exhibit stable flight where GPS signals are compromised, including inside buildings, under bridges, or underground. Vision systems and other sensors might be employed to address this instability but cannot be effectively integrated into drone flight given the current state of drone flight software and other technical limitations.

Moreover, conventional drones have a non-unified representation of space which must consider six dimensions (x, y, z, roll, pitch, and yaw) of the drone frame of reference, six dimensions of the world frame of reference, and similar sets of dimensions for each sensor or vision system frame of reference. Such a non-unified approach, even if technically achievable, is prone to problems due to its inherent complexity. Through conventional matrix manipulation, it is subject to "gimbal lock," contains no inherent means for processing, representing, and propagating error and noise, and as such is far from optimal.

SUMMARY

Embodiments of the present invention include systems and methods for control of vehicle movement, such as flight, through use of particularly represented frames of reference, relationships of error and noise to reference frames and flight paths, and the use of proper filtering and manipulation of signals, thus coherent integration of flight and sensor data from multiple visual viewpoints is enabled. Embodiments of the present invention generally relate to vehicles which are digitally controlled and have some capability of measuring their own movement, position, and orientation or attitude as well as having some capability of measuring position, orientation, and movement data of their surrounding environment and have the ability of producing and manipulating a model using the sensor data along with a stored representation of the vehicle. The vehicle may be an on-the-ground, in-air, on-water, underwater, under-ground, or in-space vehicle, device, or machine. The vehicle may have at least one driver or pilot on-board or off-board or may have no driver or pilot at all. The vehicle may or may not carry passengers. The vehicle may or may not carry a payload. Fields of usage of the vehicle or simulations thereof include scientific, business, commercial, government, medical, military, hobby, and entertainment.

In certain embodiments, through appropriate representation of reference frames, a unified representation of space is realized. The unified reference frames operated upon with geometric algebra, along with further representations of error and noise, create a basis for a new and more effective means for navigation, stability, and performance of desired flight outcomes.

In certain embodiments, the space in which a drone calculates is unified across all sensors and systems, using geometric algebra operators. This allows the drone to have a consistent, local predictive model of the world derived from various state estimations, which will be referred to herein as a "Theory of World."

In certain embodiments, errors and state variables in multiple frames from various sensors are handled in a way that allows a kinematic modeling of the vehicle. An example of this is the treatment of wind correction and collisions, which can be distinguished between and responded to differently. In conventional drone platforms, it is largely impossible to tell the difference between confronting a wall from wind or air movement, so the only answer is to avoid walls or objects and to assume all resistance is air movement. In conventional drones, handling wall confrontations and wind or air movement the same often leads to unintended consequences such as flipping upside down when confronting a wall because of misinterpretation of walls as resistance from air flow. In the case of air movement in the absence of GPS, such as in a cave or mine, the "drift" of the air movement or even drift of the gyroscopic sensor can be integrated out from the user's control bias. Certain embodiments of the present invention address this via what is called "Stick Integration," a subset of "Empathy Modeling," which is computed from data available to the vehicle including, but not limited to, user inputs as another form of sensors. The reason this is called "Empathy Modeling" is that although the human pilot (whether on board or remote) may not understand all aspects of control of the device, the device is able to make use of some signals the pilot is giving without the pilot being aware that he or she is providing them.

An approach of the present invention is a single multi-dimensional model—it maintains all reference frames at all times, which enables vision and flight-integrated automated behaviors. The present invention models various kinematic parameters of the vehicle as well as items in its environment using the multivectors of a geometric algebra. Specific parameters embedded in the multivectors can include, but are not limited to, rotational velocity, orientation, acceleration, velocity, and position. The specific method of encoding can vary depending on the type of geometric algebra being used.

In certain embodiments, the present invention optimizes a particular sensor or actuator as late as possible in the processing chain, rather than trying to build a unified space from overly optimized, small, individual spaces. This invention represents a complete shift in how the software and math is applied for flight control. It postpones evaluation of sensor meaning and informational context until that information is required. This is possible because the sensor data has numeric error or noise information embedded with it in a geometrically meaningful manner.

Any operations possible using the given geometric algebra may be applied to the multivectors. Operations such as reflections, dilations, rotations, translations, etc. can be used on the multivectors to reflect the measurements gathered by the sensors. A simpler geometric algebra may be used if only a simple model is needed. A more advanced model with more advanced operations can require a greater geometric algebra.

Certain embodiments therefore comprise elements of a) unified representation, b) treatment of sensory signals, c) management of drift, and d) representation of error or noise.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments but is not necessarily included. Thus, particular configurations of the present invention can include a variety of combinations and/or integrations of the embodiments described herein.

Figure 1:
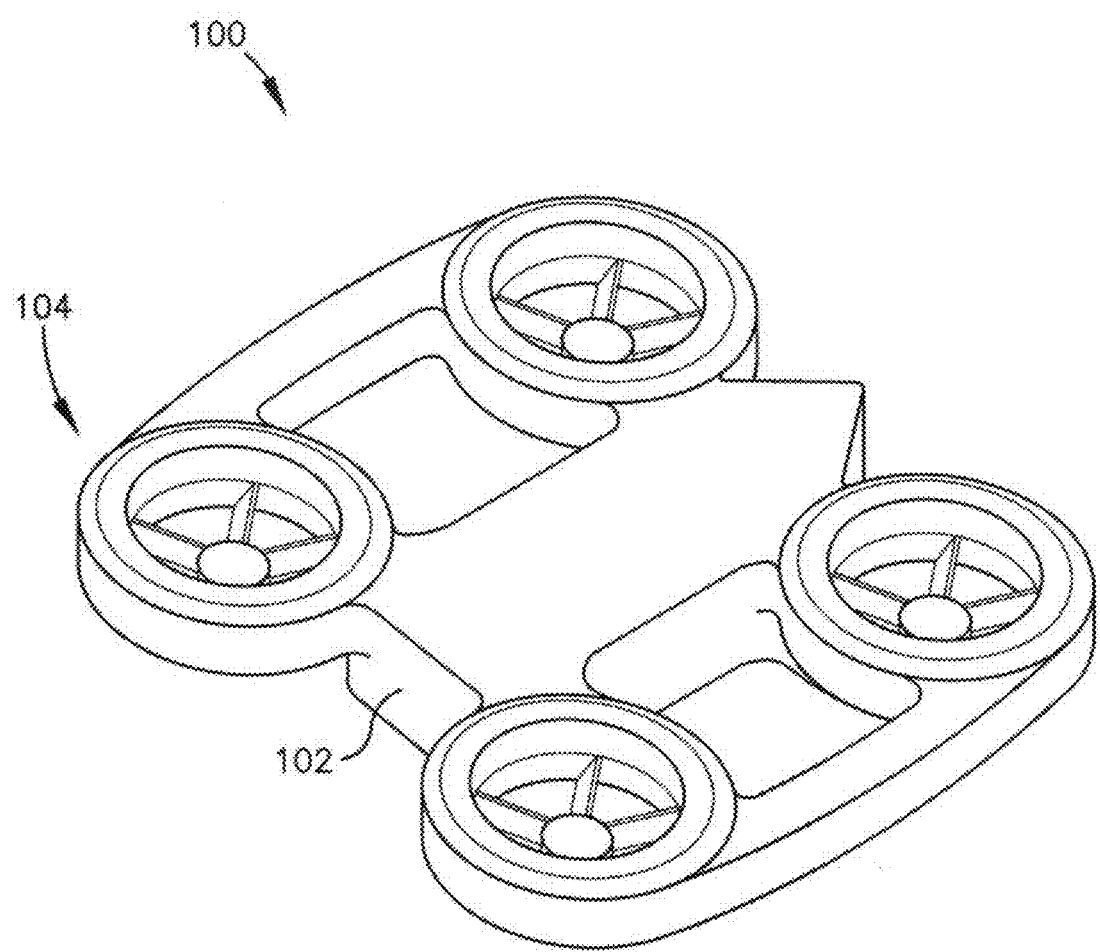
FIG. 1 is a perspective view of a drone constructed in accordance with an embodiment of the invention.
Figure 2:
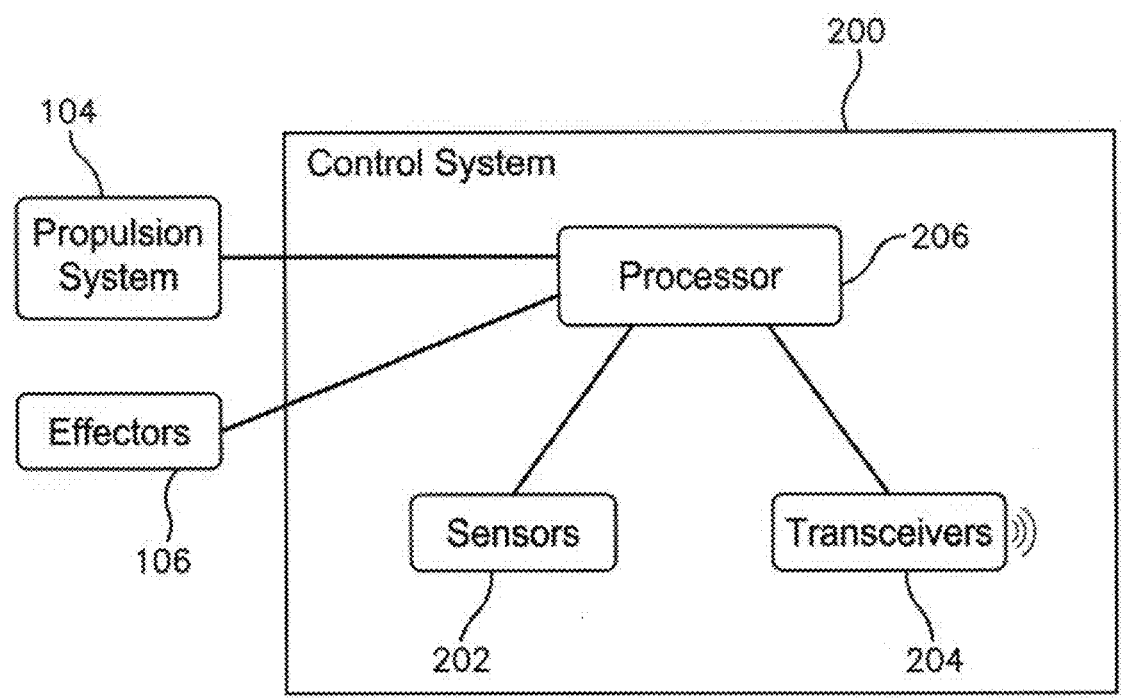
FIG. 2 is a schematic diagram of a control system of the drone of FIG. 1.
Figure 3:
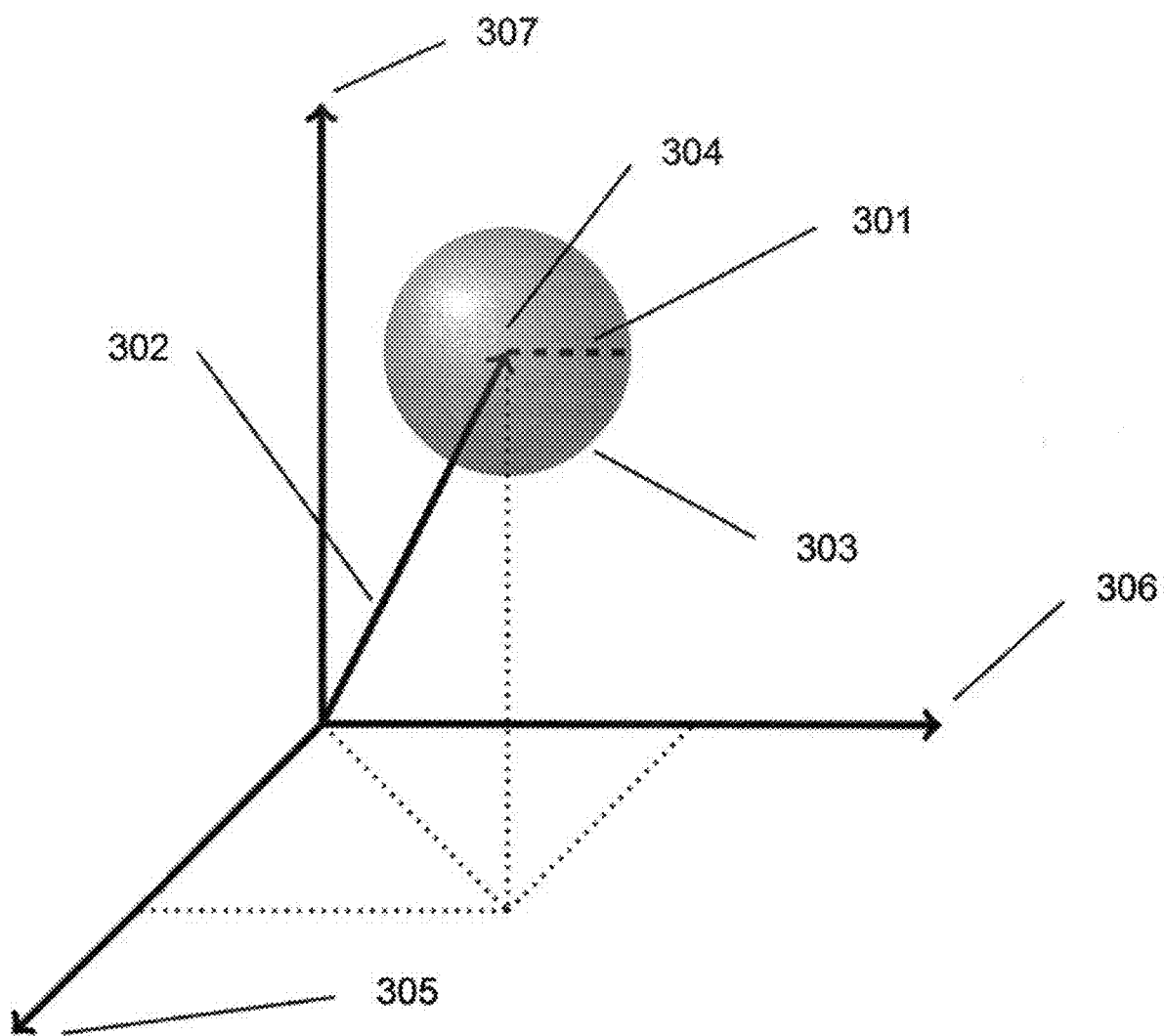
FIG. 3 is a perspective view of an error sphere and the components it is defined by (center and radius)

Turning to the drawing figures, and initially FIGS. 1 and 2, certain embodiments of the present invention may be used for controlling an autonomous or semi-autonomous device 100. The autonomous or semi-autonomous device 100 may be a drone, a robot, a vehicle, a component thereof, or any other actuatable machine or device. The autonomous or semi-autonomous device 100 may include a chassis 102, a propulsion system 104, and a plurality of effectors.

The propulsion system 104 may be mounted to the chassis 102 for generating acceleration forces. The propulsion system 104 may include propellers, rotors, rockets, jets, thrusters, compressed gas expulsion systems, buoyancy systems, actuators, wheeled drive trains, engines, motors, and the like. The propulsion system 104 may be commanded or activated by signals from a processor of the control system described below.

The effectors 106 may be mounted on the chassis 102 or mounted on or incorporated into components of the propulsion system 104 for directing the acceleration forces and/or for changing attitude or orientation of the autonomous or semi-autonomous device 100. The effectors 106 may be control surfaces, steering mechanisms, rudders, diving planes, ailerons, exhaust directors, rotors, rotating wings, and the like. The effectors 106 may be controlled by or given mechanical power by motors and actuators, and the like. The effectors 106 may be commanded by signals from the processor of the control system described below.

A control system 200 of autonomous or semi-autonomous device 100 will now be described in detail. The control system 200 broadly comprises a plurality of sensors 202, a plurality of transceivers 204 and a processor 206.

The sensors 202 sense positions, movement, and/or acceleration of the autonomous or semi-autonomous device 100 and thus may be mounted on the autonomous or semi-autonomous device 100 or positioned near the autonomous or semi-autonomous device 100. The sensors 202 may be or may include accelerometers, inertial measurement units (IMUs), motion sensors, proximity sensors, pressure sensors, cameras, gimbals, radar detectors, lidars, avionics, multi-axis gyroscopic chips, multi-axis accelerometers, magnetometers, ultrasonic distance sensors or any other suitable sensing devices.

The transceivers 204 send and receive wireless signals between the control system 200 and external devices, sensors, computing systems, and/or other autonomous or semi-autonomous devices. Each transceiver 204 may operate in any suitable frequency on the electromagnetic scale. For example, some of the transceivers 204 may be radio frequency transceivers while other transceivers may be line of sight transceivers. At least one of the transceivers 204 may receive global positioning system (GPS) data.

The processor 206 interprets data from the sensors 202 and data from the transceivers 204 and controls the autonomous or semi-autonomous device 100 according to the interpreted data and other inputs via the propulsion system 104 and/or the effectors 106, as described in more detail below. The processor 206 may include a circuit board, memory, and other electronic components such as a display and inputs for receiving external commands and a transmitter for transmitting data and electronic instructions. The processor 206 may be mounted in or on the autonomous or semi-autonomous device 100 or may be part of a remote controller or remote computing system in communication with the autonomous or semi-autonomous device 100.

The processor 206 may implement aspects of the present invention with one or more computer programs stored in or on computer-readable media residing on or accessible by the processor. Each computer program preferably comprises an ordered listing of executable instructions for implementing logical functions and controlling the autonomous or semi-autonomous device 100 according to commands and other inputs. Each computer program can be embodied in any non-transitory computer-readable medium, such as a memory (described below), for use by or in connection with an instruction execution system, apparatus, or device, such as a computer-based system, processor-containing system, or other system that can fetch the instructions from the instruction execution system, apparatus, or device, and execute the instructions.

The memory may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Mathematical Constructs

Turning to FIGS. 3-7, certain embodiments of the present invention involve modeling of the world around a vehicle such as autonomous or semi-autonomous device 100. These models of data must be encoded and stored in some data structure. In the case of this system it is a form of geometric algebra. The exact geometric algebra to be chosen can depend on the requirements placed on the autonomous or semi-autonomous device 100. A variable in geometric algebra will be called a multivector. Typically, geometric algebras are described in terms of a Clifford algebra. A Clifford Algebra is described using the symbol $\mathcal{G}$ and its signature: the number of positive dimensions, the number of negative dimensions, and the number of null dimensions. For example, if only orientation data is desired, it is possible to store the Theory of World data in a $\mathcal{G}_{3,0,0}$ algebra, but that prevents position data from also being stored in the same multivector as the orientations. For more powerful data representation, it is possible to use $\mathcal{G}_{4,0,0}$, $\mathcal{G}_{4,1,0}$, $\mathcal{G}_{3,0,1}$, $\mathcal{G}_{3,0,2}$, or algebras of even higher dimensionalities.

The features of geometric algebra contain an object called a rotor which is a mathematical object that can be used to rotate other multivectors in the space of the geometric algebra in a manner similar to rotations in the complex plane. Throughout the remainder of this document, the word rotor will refer to these geometric algebra mathematical objects except in the case of multi-rotor which is intended to describe a vehicle with multiple mechanical rotors.

U.S. Pat. No. 6,853,964 describes the geometric algebra representations of $\mathcal{G}_{4,1,0}$, which is also called Conformal Geometric Algebra (CGA). All rotations, translations, mirrors, rotations, etc. can be modeled using versors or rotors which are multivectors themselves. The versors or rotors can be multiplied with other versors or rotors to describe an overall movement or can be used for unification of reference frames.

Each type of geometric algebra allows certain geometric objects to be described using a multivector. As an example geometric algebra, CGA allows points, lines, planes, spheres, as well as other shapes to be represented in multivector form.

To simply represent a shape of some sort and to move it around would not be useful if there was no way to make use of the transformed shapes. Geometric algebra allows the extraction of the location and sizes of these various shapes and it also allows the determination of interactions between shapes. One such interaction is the intersection 602 between two shapes 601 and 603.

Certain embodiments of the present invention present a system and method of controlling vehicle movement in which measurements and state data of the vehicle—along with their associated noise and/or error—are represented as geometric algebra objects. Any mathematical operation that can be used on geometric algebra objects can therefore also be applied to the vehicle's measurements and state data. The incorporation of noise and/or error into the geometry provides several advantages that will be understood from the below discussions.

Unified Spatial Representation

Certain embodiments of the present invention keep a unified spatial representation throughout. This is done using the features of geometric algebra. Geometric algebra can model an autonomous or semi-autonomous device 100 in a manner that is coordinate free. This does not mean that coordinates are meaningless to the mathematics, but rather much of the symbolic manipulation of the mathematics can be handled early on to actually simplify the math. Later specific numeric coordinates, translation values, rotation values, errors, or noise can be fed in to solve a given problem. The following discussion considers the autonomous or semi-autonomous device 100 to be a drone, although other vehicles and devices may be used as described above.

The rotors also allow for many different frames of reference to become unified into one spatial representation. For example, a single rotor in this geometric algebra could be used to effectively shift from one frame of reference to another. In some geometric algebras, this rotor could provide the shift of both rotation and translation. The information from one viewpoint 701 can always be transformed to any other viewpoint 702 through the use of rotors. The dashed line 703 indicates the difference in viewpoints that the rotors enable.

Figure 4:
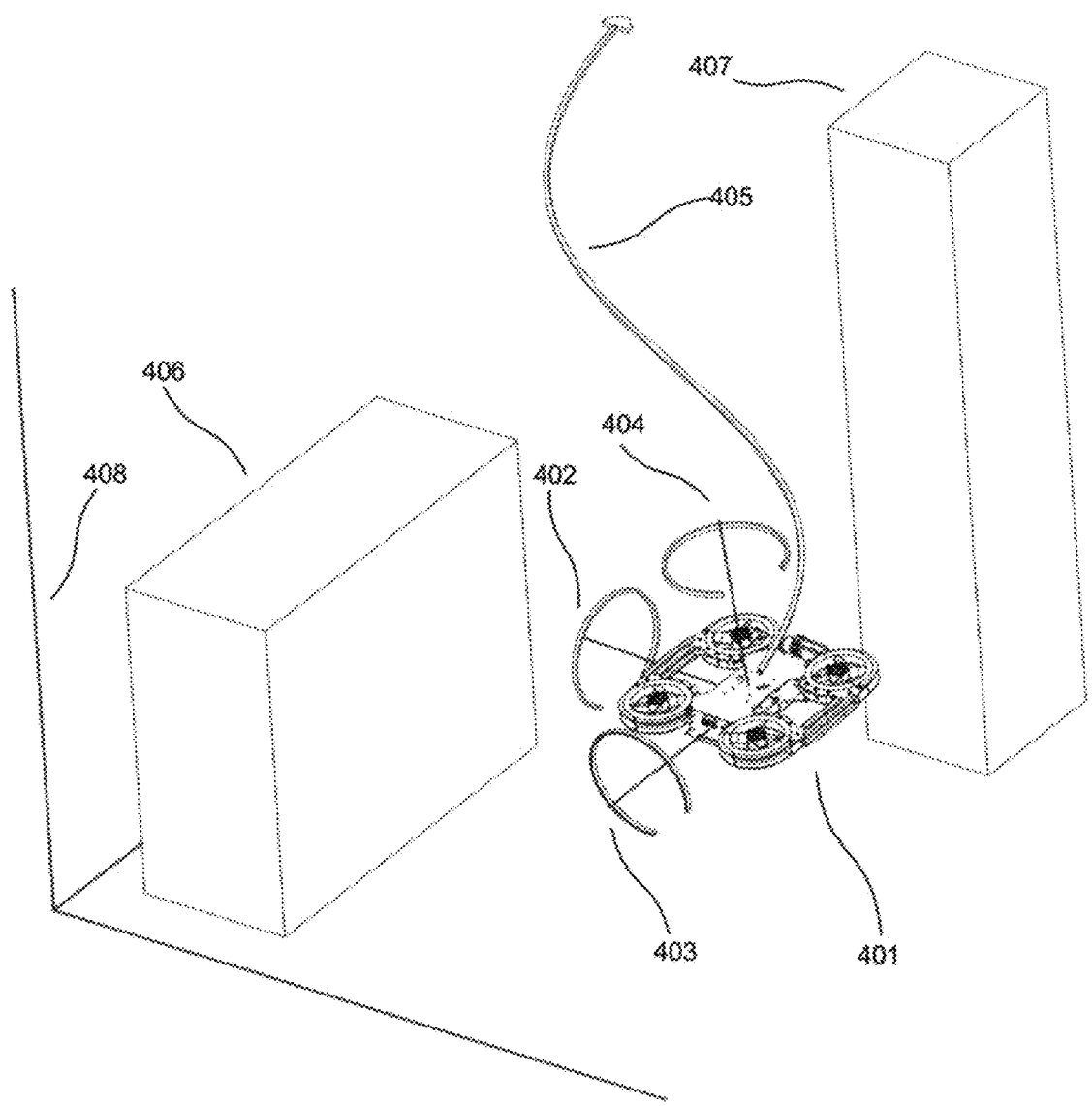
FIG. 4 is a perspective view of drone motion in multiple angles and through complex translations.
Figure 5:
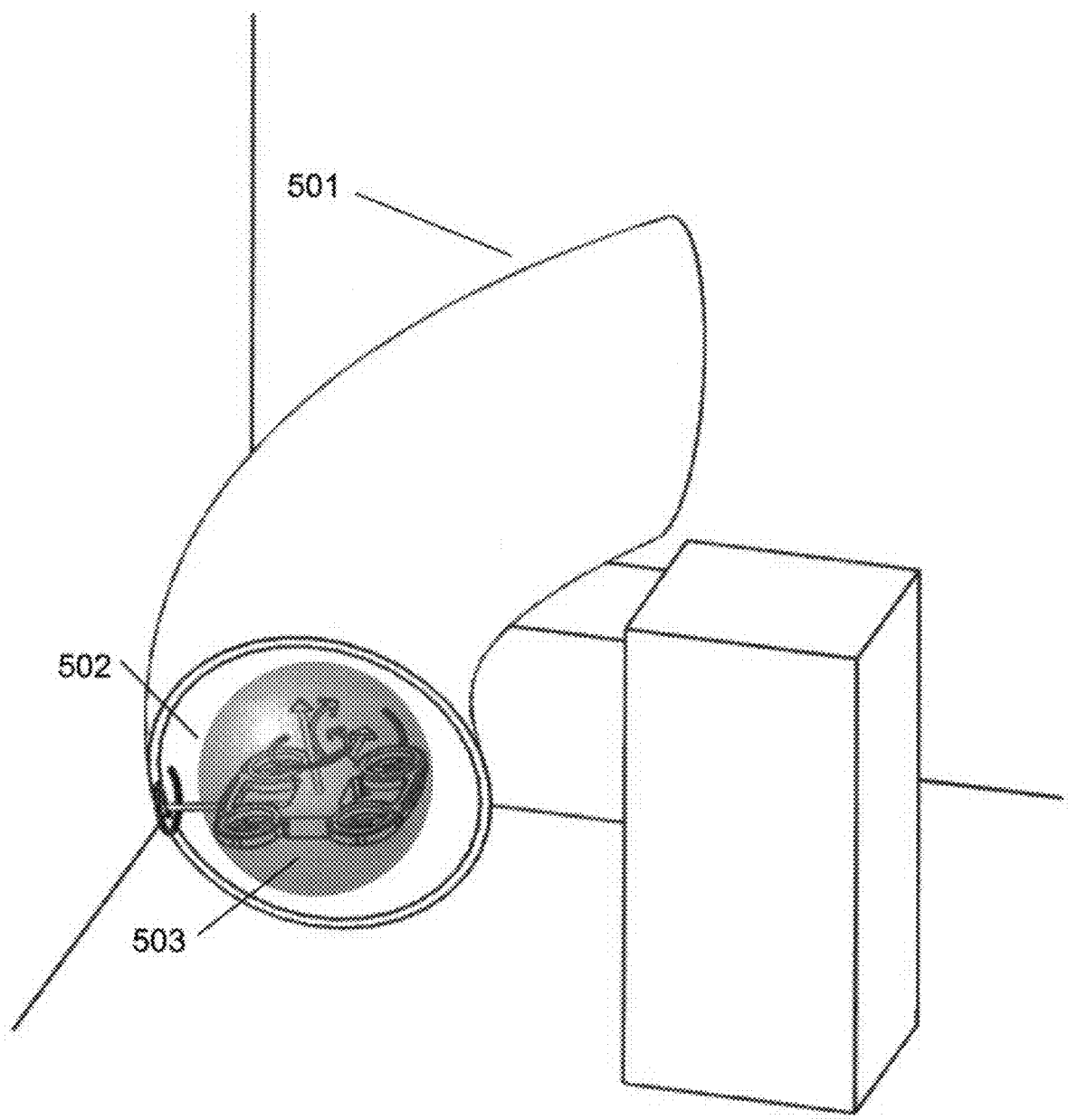
FIG. 5 is a perspective view of drone flight through a path.
Figure 6:
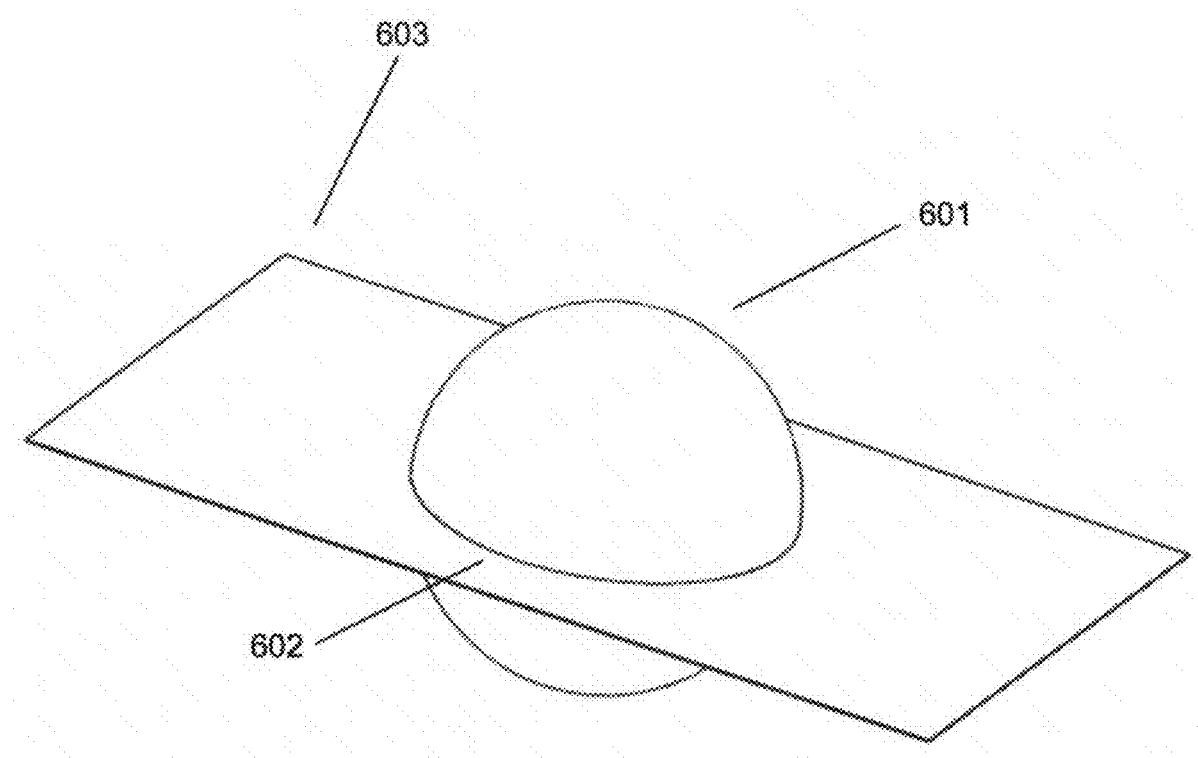
FIG. 6 is a perspective view of a Sphere intersecting a plane—a condition that can be detected.
Figure 7:
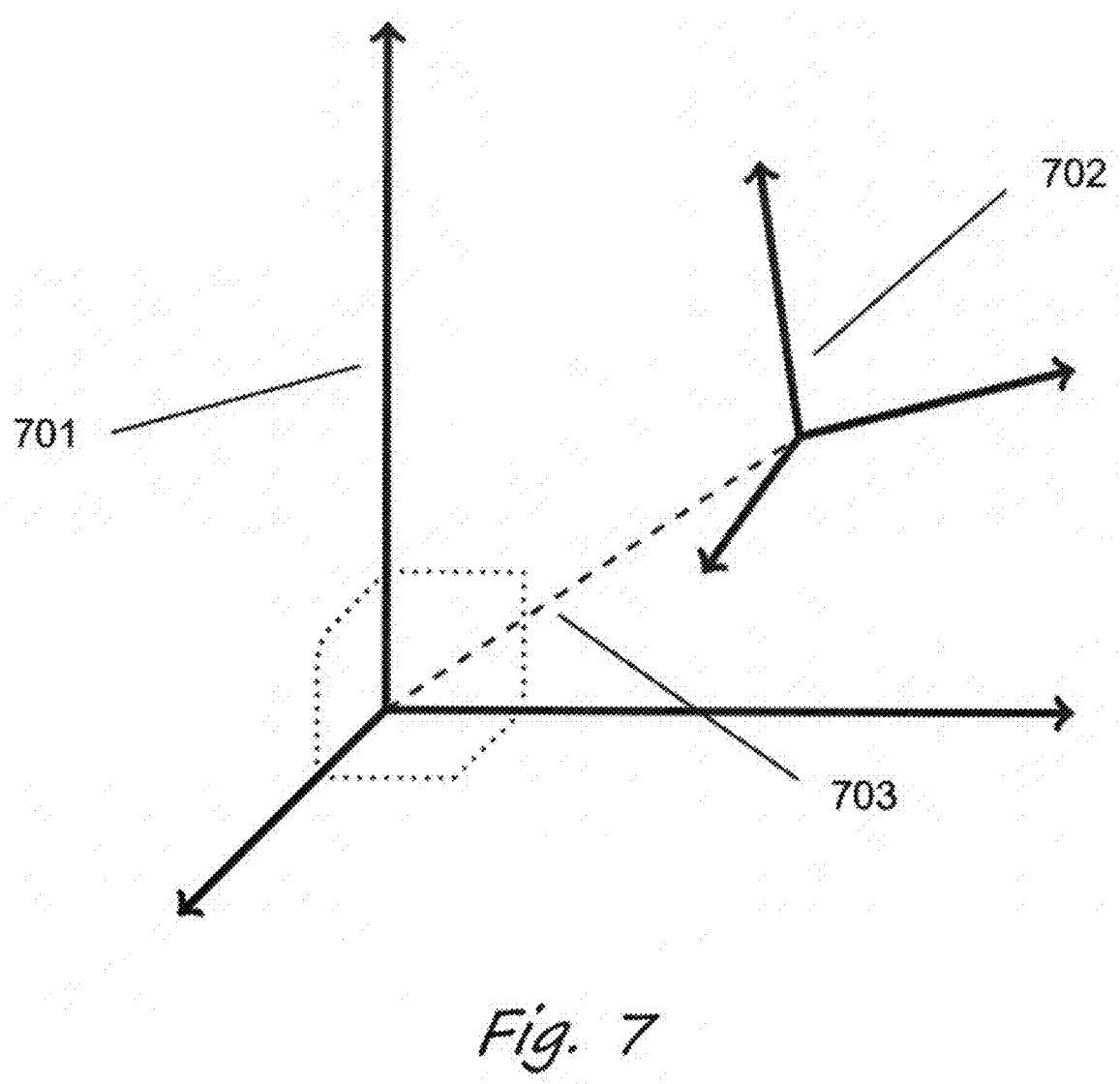
FIG. 7 is a perspective view of two frames of reference that are at different orientations and are translated relative to each other.

Unlike an automobile or airplane, a drone can rapidly move using many degrees of freedom at the same time as perceived by the user as demonstrated in FIG. 4. To use gaming terminology, it can strafe right by rolling 403, while pitching up and down 402, while yawing 404, while moving or translating through space 405. These movements will lead to many rotations and translations in a short period of time. This can severely impair an imaging system (e.g., processor 206) which stands independently; it is likely to suffer motion blur and orientation loss unless it is perfectly gimbaled, and even then, it might not be able to keep up. In a unified space, however, images can be mathematically projected in its internal model using state data from the avionics—namely orientation and translational state data. This assists the imaging system because the data from the avionics (e.g., sensors 202) indicates the characteristics of the movement which will result in motion blur. Therefore, the imaging system can either ignore or correct motion blur in some cases. Information from the imaging system is also fed into the avionics (akin to an optical flow sensor) because it is all part of the same Theory of World. This is information sharing between multiple subsystems in a common data set. This also allows the controlling of a camera gimbal from the internal state to be done easily because the orientation information from the flight control system can be used to control the motors of the gimbal.

Turning to FIGS. 11-14, and with reference to the previous figures, a key aspect of autonomous or semi-autonomous device 1210 is that there are multiple sensors 1211-1219 involved, all with their own orientation as indicated by the beams 1201-1209. The sensors 1211-1219 can all be operating in different orientations of their own. The rotors of the geometric algebra will rotate the view of the sensors 1211-1219 to the appropriate orientation in the model. These sensors can include, but are not limited to, multi-axis gyroscopic chips, multi-axis accelerometers, magnetometers, cameras, lidars, and ultrasonic distance sensors.

This geometric algebra technique allows for these many orientations and positions to be unified into one view as referenced from the chassis of the autonomous or semi-autonomous device 1210 or any other reference frame. In addition, the frame of reference (402, 403, 404) of the chassis can also be unified with the frame of reference of the world 408.

Figure 13:
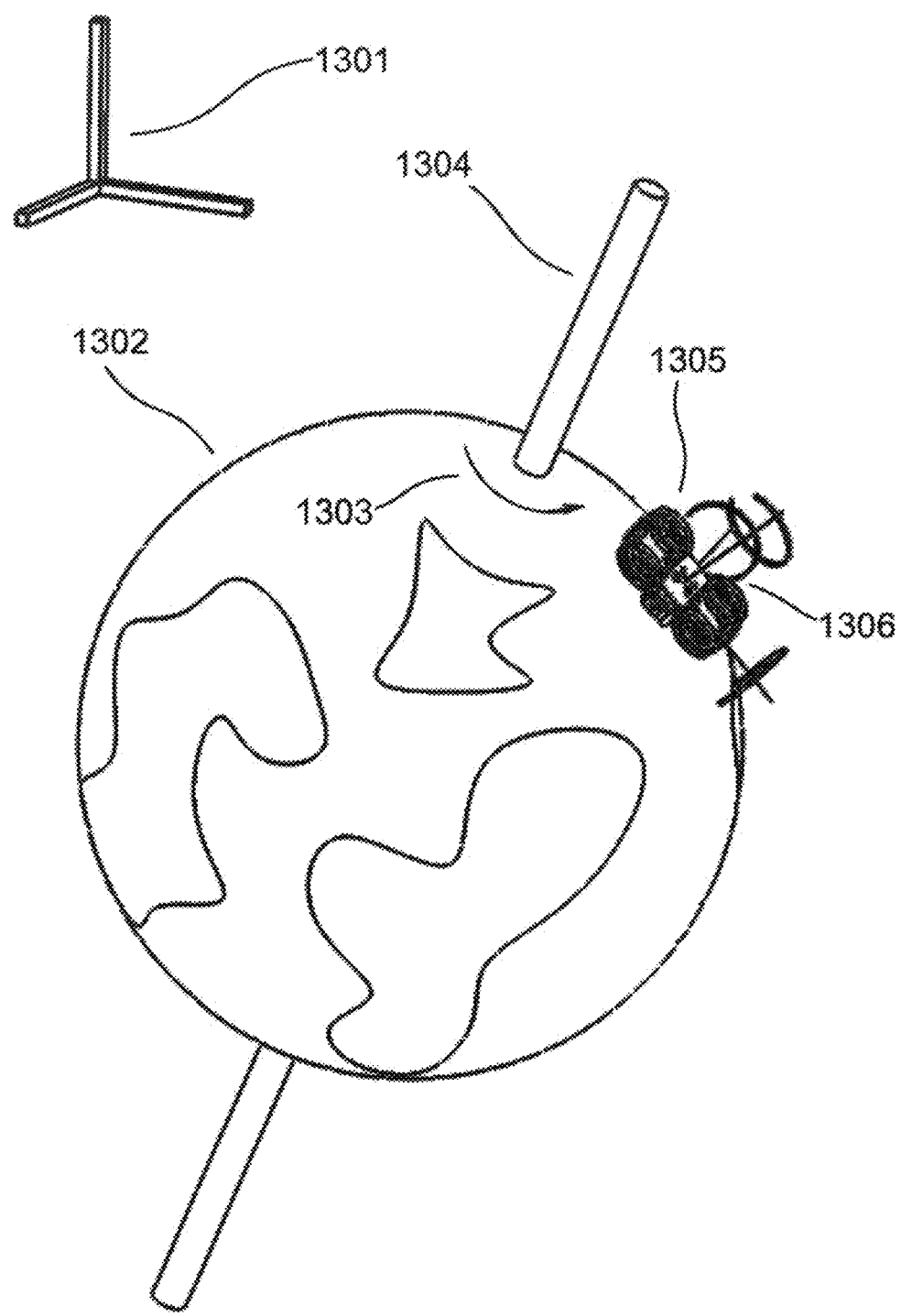
FIG. 13 is a perspective view of a sidereal reference frame with the Earth and a vehicle of the present invention.

Additionally, as shown in FIG. 13, this system can unify with a sidereal reference frame 1301 of space in order to account for the rotation 1303 of the earth 1302 about the earth's axis 1304 since that rotation 1303 affects the overall rotation measured by the gyroscope. Although there are at least three frames of reference, the sidereal reference frame 1301, the earth's reference frame 1302, and the vehicle's reference frame 1306, the rotors of geometric algebra unify all of them.

This approach is also important when multiple drones are used (see Clusters example below), since each has its own dynamic viewpoint of one shared space. Again, by using a proper geometric space, one shared Theory of World can be generated; the relationship between each vehicle and that world being a simple rotor.

The control space is also the same. Paths, orbits, or waypoints are mapped into the full geometry. For example, a GPS waypoint (latitude, longitude, and elevation) becomes either a point 304 or sphere 301 in the model space, as a geometric object. Orbits or arcs 405 also have simple geometric representations such as "tubes" 501 connecting the waypoint spheres. These tubes represent paths in the world.

Since this is the same space as the photogrammetry being done by the imaging system, it is straightforward to look for any intersections 602 which are likely to represent collision hazards. The geometric algebra has techniques to check for such intersections. Many other interactions are possible to check or measure in geometric algebra. For example, it is possible to check whether an object is on one side or the other side of a plane. Through the wedge products of the geometric algebra and the dual operator it is possible to generate the objects from the minimal number of points which define the object. For example, a sphere can be defined with any four points on its surface. Another method of generating a sphere is to define it by its center location and its radius.

Treatment of Sensory and Other External Signals, Noise, and Error

Certain embodiments of the present invention use the same computational space everywhere, connecting all local viewpoints by rotors. Not only can objects be represented by the multivectors, but also noise can be represented as well.

Errors and uncertainties also have geometric representations and can be handled dynamically. One way that noise or error can be integrated into this model is to represent the noise or error with a sphere 303. For example, the center 304 of the sphere can be used to describe the location of the vehicle while the radius 301 represents the amount of positional noise or error associated with the drone. It is convenient to assign the radius of the sphere to be one standard deviation.

When transformed, the noise or error in the transform is included and the resultant radius is either larger (more noise or error) or smaller (less noise or error). These error dimensions demonstrate how the drone's Theory of World incorporates a concept of noise or error.

For example, information from the gyroscopes can be mapped into the same geometric algebraic space used by an optical flow system, and vice versa. Information from the gyroscopes and the imaging system can be easily fused in an information filter, such as a Kalman filter. If the autonomous or semi-autonomous device 100 has only these two sensors, then the orientation model—along with the full state vector, covariance matrix, and its history—would be the drone's Theory of World. However, it is possible, and often desirable, to incorporate data from many more sensors into the Theory of World (e.g. multiple cameras, lidars, ultrasonic sensors, etc.) each carrying their own error or noise information.

Certain embodiments of the present invention maintain a fixed world reference frame 408, a dynamic vehicle reference frame (402, 403, 404) along with multidimensional flight parameters, and the evolving relationship between the two. The incorporation of optical flow information in a system which already contains translation and rotation sensor data is performed through a modern sensor fusion technique. Parameters which are sensed more accurately, with less noise and less error, are given higher confidence. Parameters, noise, and error are all saved over history and therefore parameterized over time. Also, a continuously updated transfer in the frequency domain is developed, resulting in a frequency-based confidence profile for each sensor channel. Furthermore, other special conditions (such as flight conditions of speed, acceleration, altitude, and temperature) over which each sensor might deliver different signal performance, are also quantified. Fusion then combines these data for use at all update rates appropriate to each flight control need, providing the maximum confidence available in each case.

The capability of modeling noise or error is particularly relevant in inspection applications, where it is important to get close enough to the target without hitting it; winds, updrafts, or turbulence around a bridge, for example, create a very dynamic uncertainty environment. A sphere 502 around the drone 503 represents its knowledge of where the drone is, the size of the drone, and the noise or error which is estimated for the drone's position. A wide tube 501 represents the path it should fly and remain within; this is a view of its representation in a mathematical expression.

The radius of the sphere 502 is the sum of two numbers. The first is the constant physical radius 1102 of the drone (shown in FIG. 11 as vehicle 1101). The second is the standard deviation of the noise or error associated with the position of the vehicle multiplied by a constant $k_{sd}$. If the noise or error is estimated to be zero, the physical radius component alone ensures that the size of the drone is accounted for in collisions. When noise or error is greater than zero, the overall sphere 1103 provides an additional buffer zone to account for the uncertainty of location. The constant $k_{sd}$ parameterizes how many standard deviations of avoidance zone should be provided around the vehicle at all times. The higher that $k_{sd}$ is, the less likely the drone is to collide with another object. As the amount of noise varies, the overall sphere size changes. For example if the noise has grown, the sphere becomes larger (shown as sphere 1104).

Figure 14:
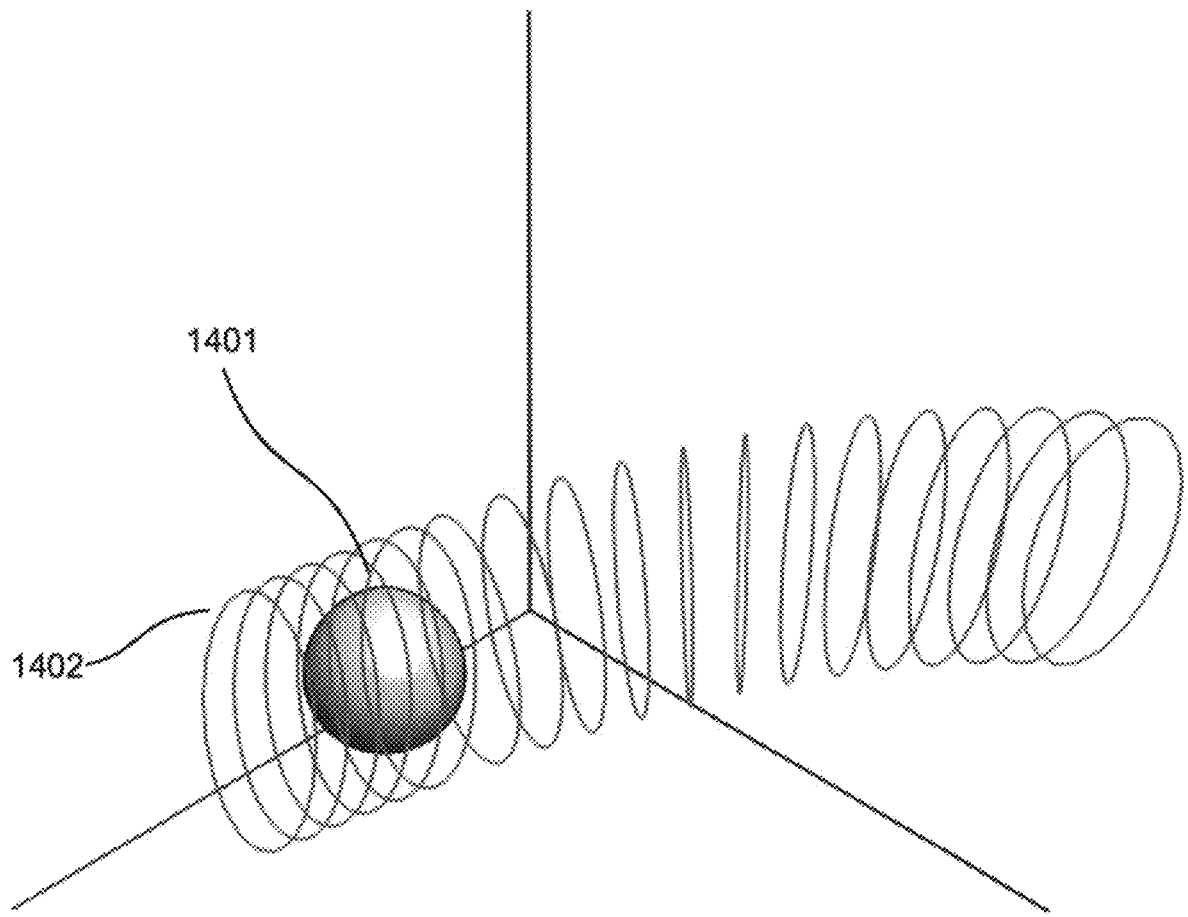
FIG. 14 is a perspective view of a sphere traveling through a path of circles.

One possible representation of a path in this present invention is a series of Conformal Geometric Algebra circles 1402 which are sufficiently close to one another as to not allow an error sphere 1401 to pass between them, as shown in FIG. 14. Should a simple intersection test fail between the drone and path, the drone can immediately execute a safety behavior such as backing off from the intersection, rerouting the path to avoid the intersection, returning to home, or landing with caution.

Drift and Attention to Information Quality and Rate

For drifts, it is vital to correct the drone's estimate of the gravity vector. Since a true gravity vector cannot be acquired for any flying vehicle from a purely inertial system—some external reference is always needed. A pressure sensor can provide a reasonably good measurement of height over medium timescales (approximately 10 sec). This is too slow for stabilization loops running at greater than 100 Hz, but the drone's Theory of World can find a delta between the measurement and a high-quality prediction. As long as the delta is due to an error in orientation, it can compute a low-frequency correction to the down vector and keep the drone stable indefinitely.

One way that certain embodiments of the present invention correct the gravity vector estimate is through "Stick Integration" which is a subset of "Empathy Modeling". The pilot of the vehicle can observe drifts in flight because the errors in orientation lead to a translational movement of the vehicle in space. The pilot's natural tendency is to correct this drift by commanding the drone to go the opposite direction from its drift. For example, if the drone begins to drift backwards, the pilot will push the translational stick forward. The drone's software will detect that the pilot is giving it a correction and therefore will correct its estimation of the relationship between the attitude or orientation of the drone and the gravity vector. One manner in which this empathy is carried out is to apply all of the right stick movements to the orientation rotor as if the right stick were an additional gyroscopic sensor. This is demonstrated within the Estimation of Orientation and Position section. Because these corrections from the right stick accumulate over time in the orientation rotor, this is referred to as "Stick Integration". Without the Kinematic Modeling techniques, this stick integration would be largely impossible.

The kinematic models of this invention distinguish the differences between forces such as wind and walls. The invention will continuously evaluate the kinematic motion of the vehicle in the context of the noise or error of the state data, while tracking the thrust it is attempting to apply via its motors. When the kinematic model indicates that the thrust from the vehicle can overcome external forces such as in windy environments, the control system will allow adjustments in flight to compensate for and overcome those external forces. However, when the kinematic model indicates that the thrust is not overcoming the external forces applied to the drone, it recognizes that the external force must be a wall. Therefore, it limits the thrust in order to maintain attitude, and thus the vehicle does not flip upside-down.

Optical flow and subsequent ego-motion determination may be applied to the problem of gyroscopic drift to effect gyroscopic drift reduction in drone flight control and stabilization. Such correction must be applied at the right point in the processing of the gyroscope information, in a coherent and integrated fashion. In particular, some aspects of stability are maintained at a fairly high frequency and low latency, significantly higher/faster than frame rates of most cameras. Typical optical flow and ego-motion algorithms have a minimum of 1 frame of latency, and often much more.

In certain embodiments of the present invention, with the advantage of temporal parameterization of sensor data along with associated noise and error as described above, multiple ego-motion estimates can be provided over a range of time and frequency on a continuous basis from both the gyroscope and optical flow. This enables gyroscope correction at rates consistent with fractions of frame times and consistent with gyroscope read rates such as between 100 Hz and 200 Hz. Computation of optical flow and ego-motion with less than a full frame of latency has more error than with a full frame or with multiple frames. The temporal nature of noise on both optical and gyroscope sensors, appropriate to the nature of those sensors, all within the unified representation as presented, makes such stability calculations easy to express, implement, test, and adjust for optimum real-time function.

This awareness of the spatiotemporal situation is required for high performance stability and is also shared with higher level functions. Examples of such functions are reason, mission objectives, and more general perception, which constitute machine awareness. Some of these higher-level functions operate at a much lower rate and require significantly more intense processing.

Basic Geometric Algebra

The following describe some basic properties of geometric algebra. Scalars are multiplicatively commutative with vectors and multivectors:

$$\lambda a = a \lambda$$

The basis vectors are anticommutative with the wedge product (outer product):

$$a \wedge b = -b \wedge a$$

However, the basis vectors are associative and distributive with the wedge product:

$$(a \wedge b) \wedge c = a \wedge (b \wedge c)$$

$$a \wedge (b+c) = a \wedge b + a \wedge c$$

The vectors are commutative with the dot product:

$$a \cdot b = b \cdot a$$

The geometric product of vectors is made up of the dot product and wedge (outer) product:

$$ab = a \cdot b + a \wedge b$$

The dot product and wedge product for vectors can be defined in terms of the geometric product:

$$a \cdot b = \frac{1}{2}(ab + ba)$$

$$a \wedge b = \frac{1}{2}(ab - ba)$$

A reverse of a multivector is designated with a tilde over the multivector (e.g., $\tilde{R}$) or after parenthesis. The reverse operation reverses the order of all of the outer products. For example, the following shows a reverse:

$$(5+e^2 \wedge e^3)\tilde{} = (5+e^3 e^2) = (5-e^2 e^3)$$

This identity also holds true:

$$(\widetilde{R_2 R_1}) = \tilde{R}_1 \tilde{R}_2$$

It should be noted that these bivectors squared behave like imaginary numbers:

$$(e_1 \wedge e_2)^2 = (e_2 \wedge e_3)^2 = (e_3 \wedge e_1)^2 = -1$$

Conformal Geometric Algebra

The Conformal Geometric Algebra described herein uses $\mathcal{G}_{4,1,0}$ algebra for illustrative purposes. Other Conformal Geometric Algebra constructs may be used without limiting the scope of the invention. The $\mathcal{G}_{4,1,0}$ algebra is made up of the following five orthogonal basis vectors $e_1$, $e_2$, $e_3$, $e_+$, and $e_-$. These basis vectors have the following important properties:

$$e_1^2 = e_2^2 = e_3^2 = e_+^2 = 1$$

$$e_-^2 = -1$$

The $e_+$ and $e_-$ basis vectors can be combined in the following ways to make null vectors:

$$n = e_- + e_+$$

$$\bar{n} = \frac{1}{2}(e_- - e_+)$$

The square of the null vectors is equal to 0:

$$n^2 = (e_- + e_+)^2 = 0$$

$$\bar{n}^2 = \left(\frac{1}{2}(e_- - e_+)\right)^2 = 0$$

In order to use Conformal Geometric Algebra, it must be possible to map from 3D Euclidean space into the Conformal space. The following explains that mapping.

A point 304 in conformal space is defined by the following equation where x is the vector 302 in 3D space describing the location of the point 304 and X is the conformal representation of the point:

$$X = x + \frac{1}{2}x^2 n + \bar{n}$$

The vector 302 is in terms of the $e_1$ 305, $e_2$ 306, and $e_3$ 307 unit basis vectors.

A sphere 303 in conformal space is defined by the following equation where ρ is the radius 301 and X is the conformal point 304 at the center of the sphere:

$$S = X - \frac{1}{2}\rho^2 n$$

Note that this indicates a point is equivalent to a sphere with zero radius. As the coefficient of the n null vector decreases, the radius of the sphere increases.

A circle C in conformal space is defined by the following equation where $S_1$ and $S_2$ are spheres that intersect at the circle:

$$C = S_1 \hat{} S_2$$

There are numerous operations that can be applied to the geometric objects of this Conformal Geometric Algebra. A couple are highlighted here. It is important to be aware that in Conformal Geometric Algebra the concept of a rotor is used for both rotations and for translations.

To prepare for a rotation of an object by an angle of θ in the bivector $\hat{B}$ plane about the origin, a rotor R is created:

$$R = e^{-\hat{B}\theta/2} = \cos\left(\frac{\theta}{2}\right) - \hat{B}\sin\left(\frac{\theta}{2}\right)$$

To then rotate the object S into S' using the rotor R:

$$S' = RS\tilde{R}$$

To prepare for a translation of an object by a 3D vector a, the following rotor R is created:

$$R = 1 + \frac{na}{2}$$

To translate the object S into S' using the rotor R:

$$S' = RS\tilde{R}$$

To reverse a rotation or translation of S' back into S the equation may be reorganized like this:

$$S = \tilde{R}S'R$$

To create a combined rotor $R_{combo}$ from multiple individual rotors such as $R_1$ followed by $R_2$ followed by $R_3$:

$$R_{combo} = R_3 R_2 R_1$$

This combined rotor is then used like the other rotors have been used:

$$S' = R_{combo} S \tilde{R}_{combo} = R_3 R_2 R_1 S \tilde{R}_1 \tilde{R}_2 \tilde{R}_3$$

EXAMPLE

Estimation of Orientation and Position

Figure 8:
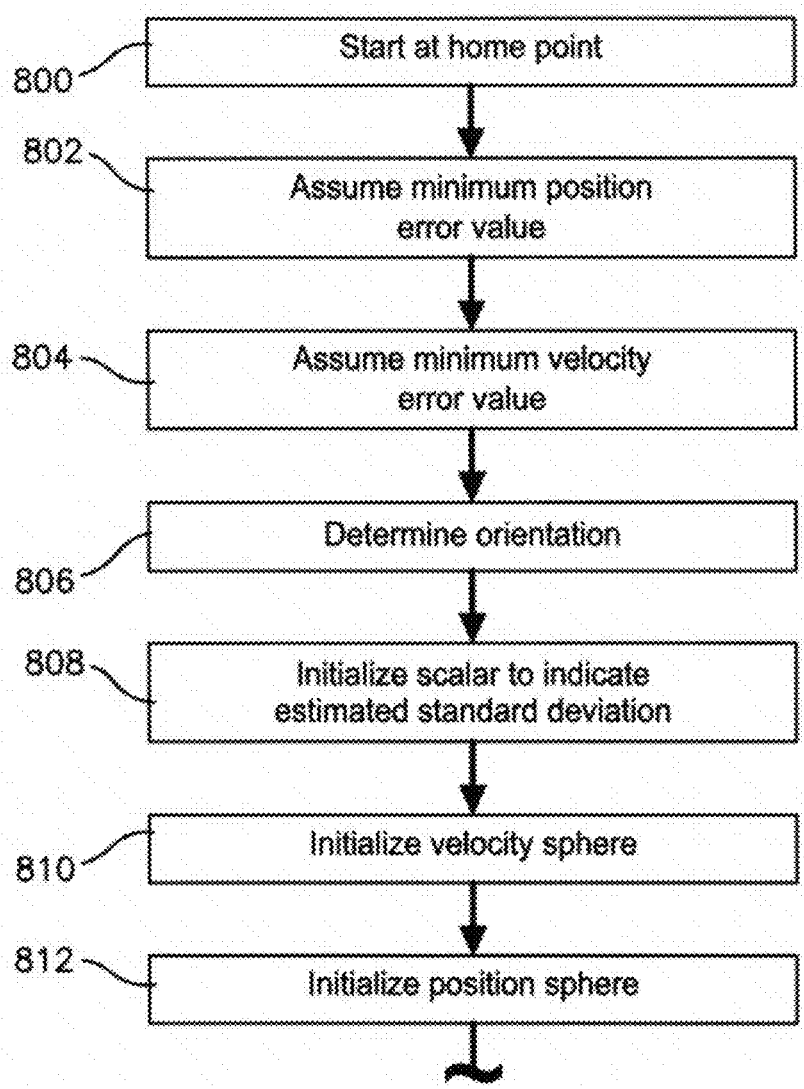
FIG. 8 is a flow diagram of a method of estimating orientation and position of a drone and integrating associated error and noise in accordance with another embodiment of the invention.
Figure 9:
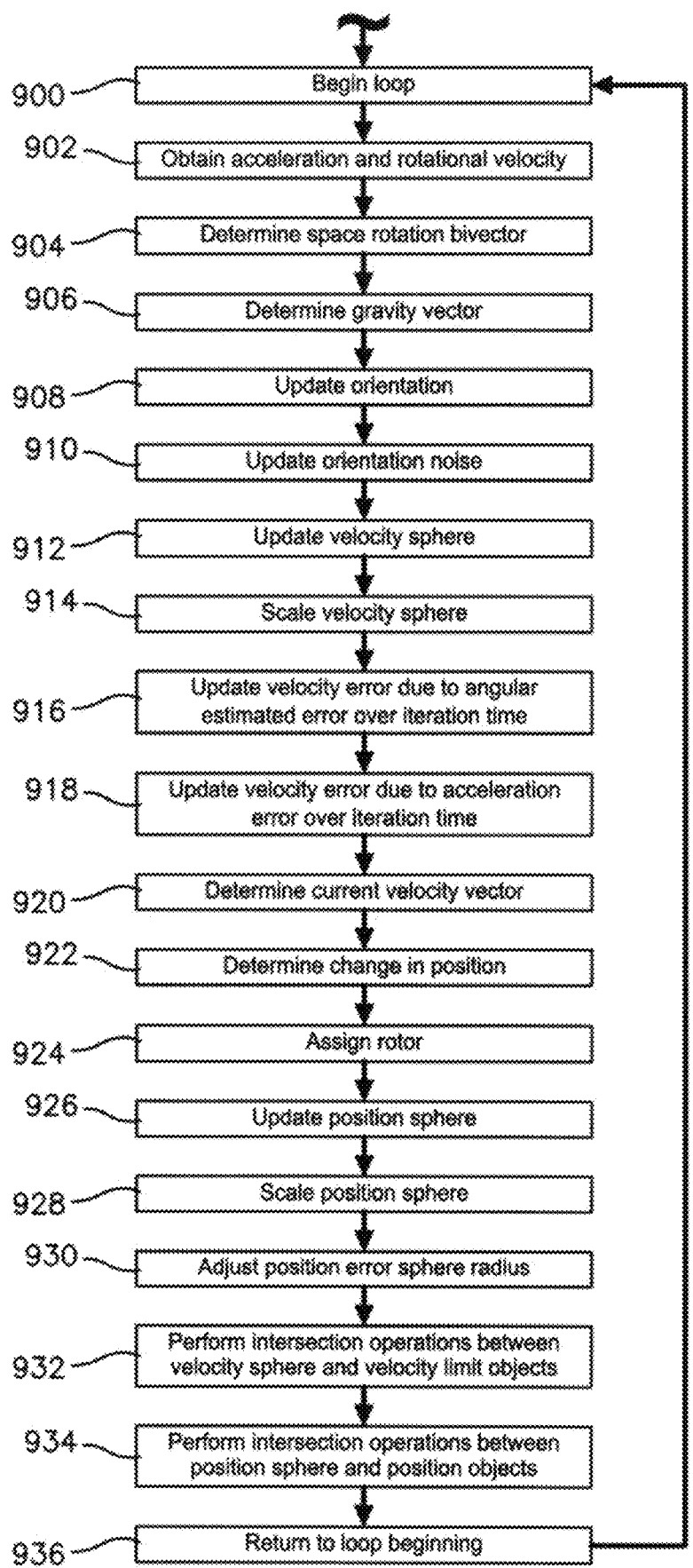
FIG. 9 is an extension of FIG. 8.

Turning to FIGS. 8 and 9, an orientation and position estimation of the autonomous or semi-autonomous device 100 including integration of the associated noise or error, will now be described. Note that in all of the mathematical symbols below, subscripts are not intended to be used as an index. They exist to distinguish between symbols. Whenever an assignment of a variable is occurring in the algorithmic description, then :=is used to explicitly indicate assignment rather than equality. For example, the following indicates that x is to be incremented by 1:

x:=x+1

These steps implement kinematic techniques in the Conformal Geometric Algebra. This is a simple example where there are no additional sensors beyond a gyroscope and accelerometer except as noted.

Start with the autonomous or semi-autonomous device 100 resting motionless at an arbitrary home point, as shown in block 800. This corresponds to a zero position and zero velocity. It also ensures that the only acceleration sensed by the vehicle is due to gravity.

Set an initial minimum position error value: $\varepsilon_p = \varepsilon_{p,min}$ (e.g. $\varepsilon_p = \varepsilon_{p,min} = 0$), as shown in block 802. $\varepsilon_p$ will be the radius of a Conformal Geometric Algebra sphere in later steps. Set an initial minimum velocity error value: $\varepsilon_{84} = \varepsilon_{v,min}$ (e.g. $\varepsilon_v = \varepsilon_{v,min} = 0$), as shown in block 804. $\varepsilon_v$ will be the radius of a Conformal Geometric Algebra sphere in later steps.

Using sensors such as the accelerometer, magnetometer, etc., determine the orientation of the autonomous or semi-autonomous device 100 given that the autonomous or semi-autonomous device 100 is not moving and initialize $R_o$ based on that measurement, as shown in block 806. $R_o$ should reflect the rotation of the vehicle from a flat orientation. If the vehicle were perfectly placed flat so that gravity was straight down, then $R_o$ would equal one. This rotor will use a subspace of the Geometric algebra which includes the scalar and bivectors. In some cases a magnetometer could also be used in this step to set the heading aspect of $R_o$. Without the information from a magnetometer or other sensor data, absolute heading cannot be known.

A scalar $\varepsilon_o$ will be initially set to zero or some other minimal value to indicate the estimated standard deviation in the noise of orientation, as shown in block 808. The $\varepsilon_0$ value summarizes the orientation error or noise in all axes together. Its "units" are radians.

A sphere V with the sphere's center indicating velocity and its radius $\rho_v = \varepsilon_v$ representing noise or error is initialized, as shown in block 810. The center of V will be initialized to the initial velocity vector $v_0$ which will typically be 0. $V_0$ is the conformal space point representing the initial velocity.

$$V_0 := v_0 + \frac{1}{2}v_0^2 n + \bar{n}$$

$$V := V_0 - \frac{\varepsilon_v^2 n}{2} = v_0 + \frac{1}{2}(v_0^2 - \varepsilon_v^2)n + \bar{n}$$

A sphere P will represent the position of the drone, as shown in block 812. The sphere's center indicates position and its radius indicates error or noise in position. The conformal point $P_0$ is created using the vector $p_0$. The $p_0$ vector can be set to 0 to indicate an arbitrary initial point in space or it could be any other encoded value. The initial radius of P will be $\rho_p = \varepsilon_p$.

$$P_0 := p_0 + \frac{1}{2}p_0^2 n + \bar{n}$$

-continued $$P := P_0 - \frac{\varepsilon_p^2 n}{2} = p_0 + \frac{1}{2}(p_0^2 - \varepsilon_p^2)n + \bar{n}$$

A new loop is started at block 900.

First, get a new IMU sample of both acceleration $a_v$ and rotational velocity $\Omega_v$ (both in the vehicle reference frame), as shown in block 902.

Generate, based on whatever data sources desired, a bivector $\hat{\Omega}_e$ which is an estimate of the rotation rate of space relative to earth—more specifically the rate of space relative to the home point, as shown in block 904. Theoretically $\hat{\Omega}_e$ can remain constant since the home point is fixed relative to the rotation of the world, but there may be cases when a correction is needed such as an error in latitude or an error in heading. If $\hat{\Omega}_e$ is assumed constant, then it doesn't need to be recalculated during every cycle of the loop. It should be noted that the magnitude of $\hat{\Omega}_e$ is global, only the direction of $\hat{\Omega}_e$ is uncertain.

Based on sensor data and/or state data, generate an estimated gravity vector $\hat{g}$ in the world reference frame as located at the center of P, as shown in block 906. Once again, especially in flights over a relatively small area of the surface of the world, $\hat{g}$ should be able to remain constant. However, if the autonomous or semi-autonomous device 100 travels far enough or enough error existed initially, then $\hat{g}$ may need to be adjusted. If $\hat{g}$ is assumed to be constant, then it doesn't need to be recalculated during every cycle of the loop. It is clear that the magnitude of $\hat{g}$ is nearly the same anywhere on the surface of the earth, but the direction of $\hat{g}$ is what will primarily need adjustment.

The step in block 908 is based on this analysis: Rotor $R_{do}$ is the rotation change of the drone relative to earth. Rotor $R_{de}$ is the rotation of space relative to earth. Rotor $R_{dg}$ is the rotation of space relative to the drone. An update of the total rotation of the drone relative to earth must be:

$$R_o := R_{do} R_o$$

With brief reference to FIG. 13, the rotation change of drone 1306 relative to earth 1302 ($R_{do}$) is the same as the rotation of the drone 1306 relative to space 1301 ($\tilde{R}_{dg}$) further rotated by the rotation of space 1301 relative to earth 1302 ($R_{de}$). Thus:

$$R_{do} = R_{de} \tilde{R}_{dg}$$

The component rotations are:

$$R_{de} = e^{-\hat{\Omega}_e \Delta t/2}$$

$$R_{dg} = e^{-\Omega_v \Delta t/2}$$

Therefore:

$$R_{do} = e^{-\hat{\Omega}_e \Delta t/2} e^{\Omega_v \Delta t/2}$$

Update the orientation of the autonomous or semi-autonomous device 100, by composing the $R_o$ rotor with the additional rotations, as shown in block 908. This can be done with the following equation.

$$R_o := e^{-\hat{\Omega}_e \Delta t/2} e^{\Omega_v \Delta t/2} R_o$$

For empathy modeling in the form of stick integration, the $R_o$ rotor may be rotated additionally based on a rotation rate $\Omega_s$, which is derived from the position of the translation stick position in its two axes ($q_x$ and $q_y$), and a constant $k_s$ which acts as a scaling factor. This allows error corrections that the pilot makes to be integrated into the orientation over time.

$$\Omega_s: q_x(e_3 \hat{} e_1) - q_y(e_2 \hat{} e_3)$$

$$R_o := e^{-\Omega_s k_s \Delta t/2} R_o$$

For each sample of gyroscopic data, there is an additional amount of noise added. It can be thought of as additional noise power or additional noise energy being added to the total noise. The additional noise from the gyroscope will be called a $\sigma_g^2$. Therefore, the total amount of noise in the orientation, $\varepsilon_o^2$, is updated with the following formula, as shown in block 910.

$$\varepsilon_o^2 := \varepsilon_o^2 + \sigma_g^2$$

Vector $\delta_v$ is the change in velocity due to acceleration in the device's reference frame over the time period measured. In this equation, it can be seen that $\hat{g}$ is rotated into the vehicle frame of reference.

$$\delta_v := (a_v - R_o \hat{g} \tilde{R}_o) \Delta t$$

Create a new translation rotor in the vehicle's frame of reference that will be used to translate by $\delta_v$.

$$T_{vv} := 1 + \frac{n \delta_v}{2}$$

Then create a $T_{ve}$ rotor which is a rotation of the $T_{vv}$ rotor into the earth's frame of reference.

$$T_{ve} := \tilde{R}_o T_{vv} R_o$$

Update the velocity sphere, which is in the earth's frame of reference, using the $T_{ve}$ rotor, as shown in block 912.

$$V := T_{ve} V \tilde{T}_{ve}$$

Scale V, if needed so that the coefficient of $\bar{n}$ is 1, as shown in block 914. This ensures that the following steps which resize the sphere work correctly as they assume $\bar{n}$ has a coefficient of 1.

Update the error in the velocity due to the angular estimated error over the time of this iteration of the loop, as shown in 916. In this case, it is known that 1 $Y_g$ of noise is happening in a rotation manner. That noise is happening at a distance of $\delta_v$ from the previous center of the sphere, so it adds the square of $\delta_v \sigma_g$ to the noise of the velocity sphere.

$$V := V - \frac{(\delta_v \sigma_g)^2 n}{2}$$

Update the error in the velocity due to the acceleration error over time, as shown in block 918. Increase the size of the velocity sphere by the additional velocity error $\sigma_v^2$ for this time period based on the noise model. Note that in this example the radius of the sphere only grows, but in other variations on the algorithm other sensors can help stabilize or even reduce the radius of the sphere.

$$V := V - \frac{\sigma_v^2 n}{2}$$

Determine the current velocity vector of the drone by determining the center of the velocity sphere, as shown in block 920.

$$v := \frac{-\langle \bar{n} V n \rangle_1}{V \cdot n}$$

Determine $\delta_p$ which is the change in position based on acceleration and the velocity, as shown in block 922. The $\delta_p$ vector is in the earth's frame of reference.

$$\delta_p := \frac{1}{2}(\tilde{R}_o a_v R_o - \hat{g})(\Delta t)^2 + v\Delta t$$

Assign the $T_p$ rotor based on this equation, as shown in block 924.

$$T_p := 1 + \frac{n\delta_p}{2}$$

Update the position sphere, as shown in block 926.

$$P := T_p P \tilde{T}_p$$

Scale P so that the coefficient of n is 1, as shown in block 928.

Increase the position error sphere radius by the square of $\sigma_p$, as shown in block 930. $\sigma_p$ is the additional noise in position per iteration. $\sigma_p$ is determined from the noise model of the system. Note that in this example the radius of the sphere only grows, but in other variations on the algorithm other sensors can help stabilize or even reduce the radius of the sphere.

$$P := P - \frac{\sigma_p^2 n}{2}$$

Calculate $\varepsilon_p$ to determine the radius of the position error sphere:

$$\varepsilon_p := \sqrt{P \cdot P}$$

A sphere to be used for interference checks called Z which is concentric with P may be created. The radius of Z is the sum of $r_{device}$ (the radius of the drone) and $k_{sd}$ times $\varepsilon_p$.

$$Z := P + \frac{(\varepsilon_p^2 - (r_{device} + k_{sd}\varepsilon_p)^2)n}{2}$$

Intersection operations etc. may be used between V and velocity limit objects to check that velocity limits haven't been exceeded, as shown in block 932.

Intersection operations etc. may be used between Z and models of walls and other objects to check for possible collisions of known modeled objects, as shown in block 934.

If desired, $\varepsilon_o$ may be compared against a limit to ensure orientation error is in an acceptable range.

If desired, it is also possible to determine the radius of V so that it may be checked against limits.

Go back to start of loop per block 936.

EXAMPLE

Clusters

In a cluster application, a number of drones may swarm over an area. For example, ten mapping drones may swarm over an urban area. The drones may constantly move to keep relatively even coverage over a relevant area while not hovering in their own or each other's jet wash. Each drone transmits position information as well as identity information. Each drone operates in a self-centered fashion to produce the required application behavior in a distributed fashion. The requirement to move while keeping out of each other's jet wash is implemented by assuring that the drones keep some distance from each other. To that end, a sphere is mathematically modeled to act as an intended exclusion area near the drone while a larger sphere is modeled to act as an intended inclusion area in order to keep close enough to other drones to assure sufficient overlap in sensor coverage to accomplish the mapping objective. Those spheres include some extra size to express error in position as described above. Ground nodes with more computing power can assemble a ground model obtained form all the drones in the swarm using conventional reconstruction software methods along with video to produce a full remotely sensed map.

The computation space is unified within each drone and furthermore can be unified in the ground node(s). As such, reasoning about the whole swarm is simplified, has reduced latency, and can track uncertainties (errors).

System Control Description

Figure 10:
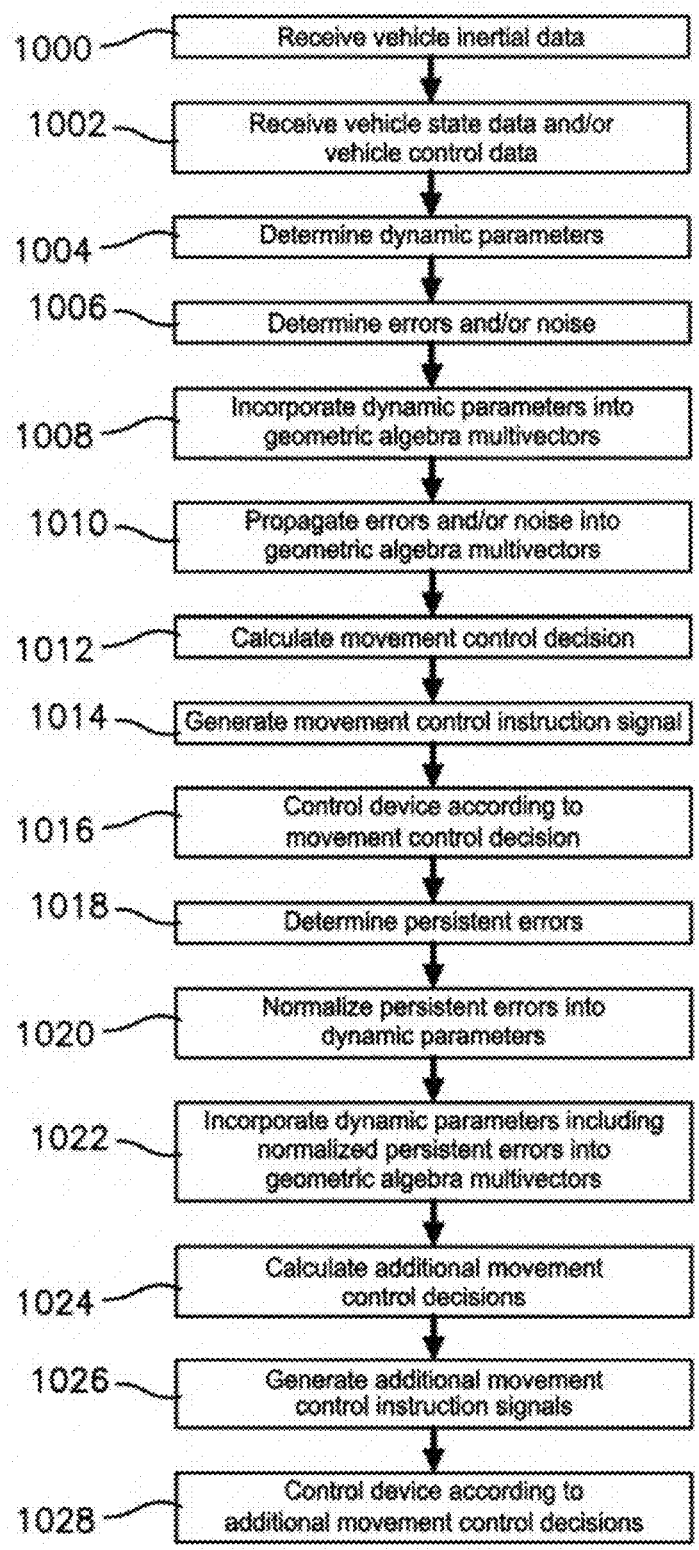
FIG. 10 is a flow diagram of a method of controlling a drone in accordance with another embodiment of the invention.
Figure 11:
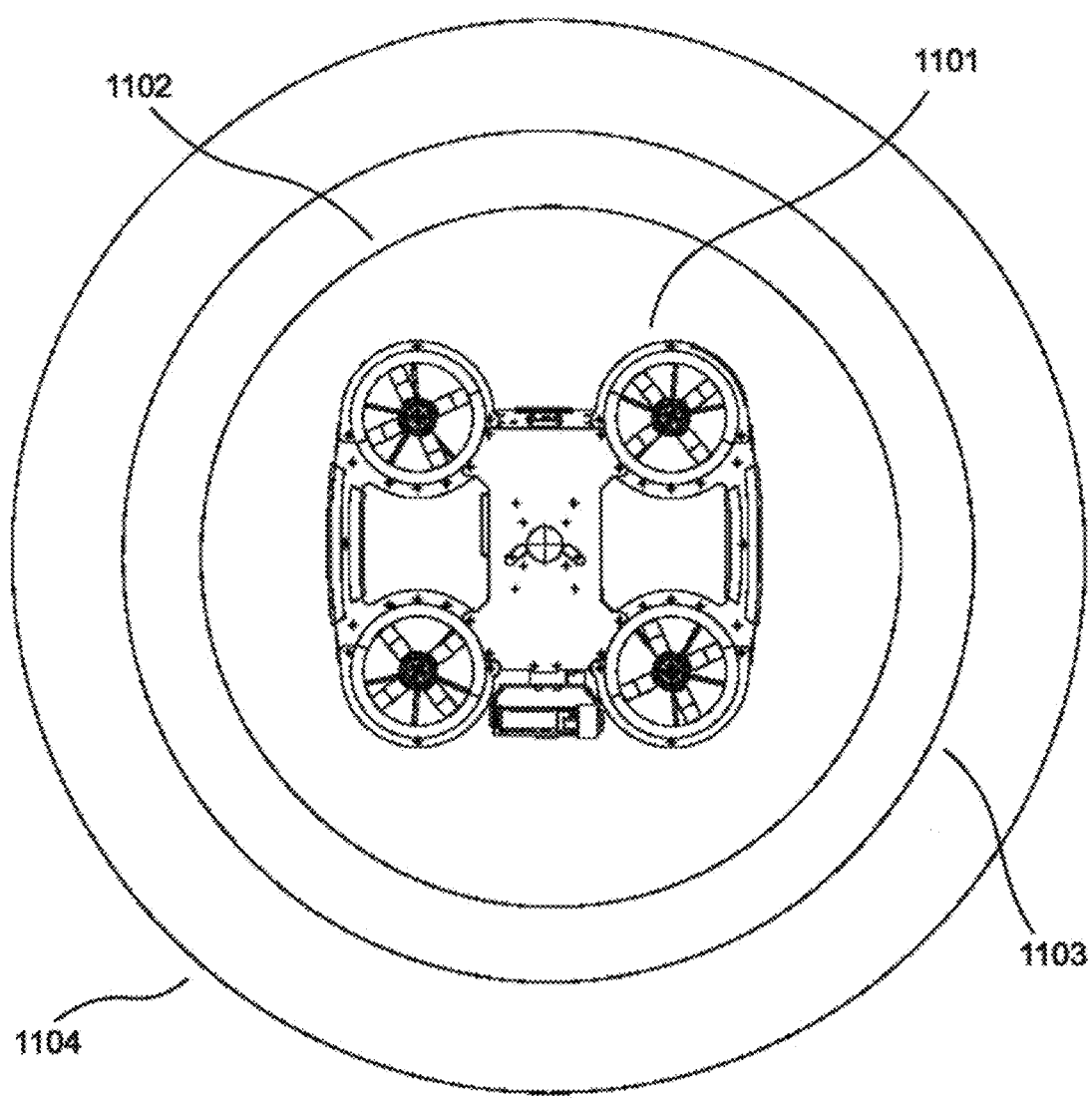
FIG. 11 is a plan view of a drone surrounded by its physical radius-based sphere and expanded spheres that include noise or error.
Figure 12:
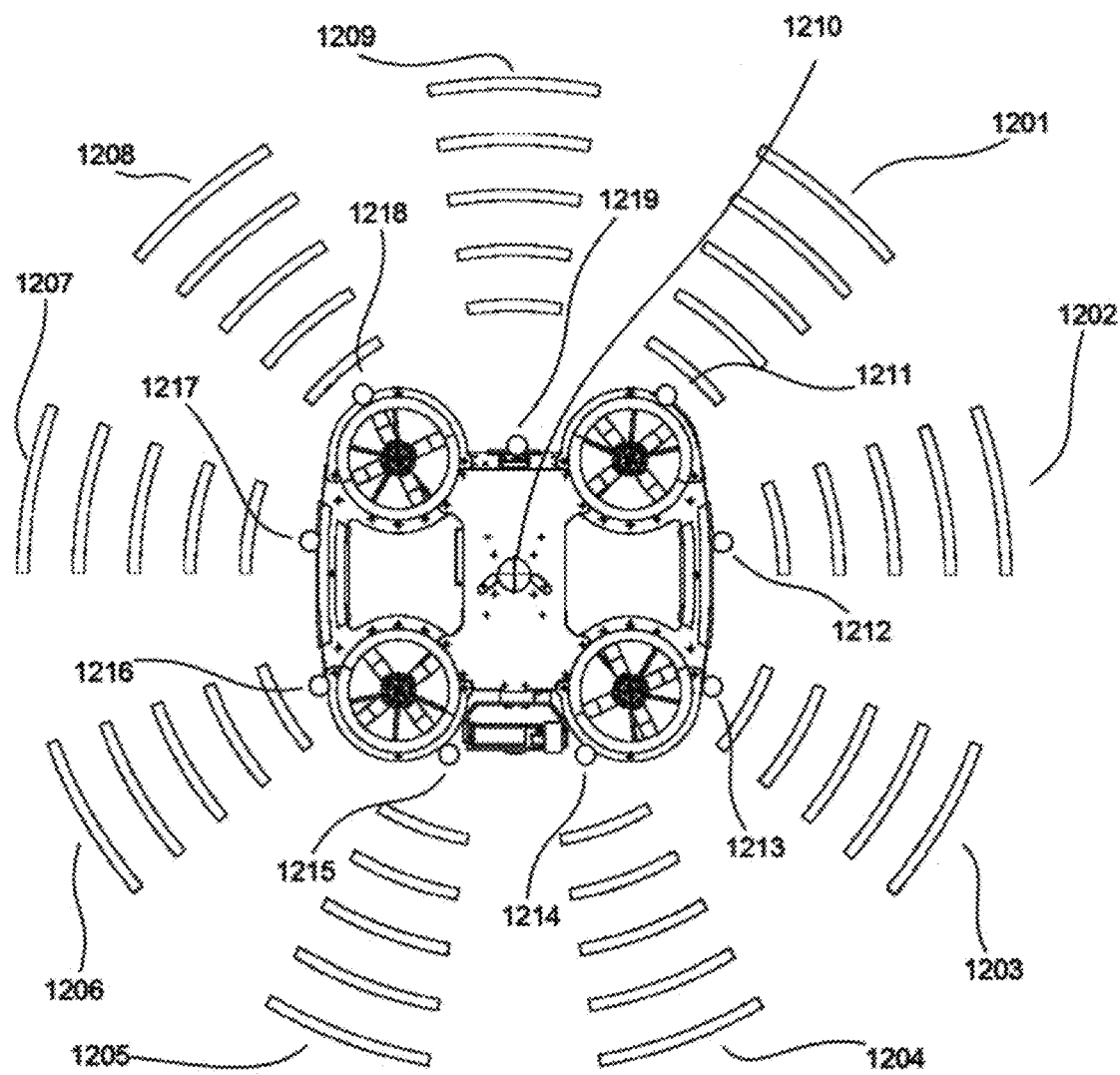
FIG. 12 is a plan view of sensors on a drone and the beams generated due to their associated orientations.

Turning to FIG. 10, an exemplary method of controlling movement of the autonomous or semi-autonomous device 100 will now be described in detail. First, vehicle inertial data may be received or obtained from the an IMU, as shown in block 1000.

At least one of vehicle state data and vehicle control data may also be received via one of the transceivers 204 or an optical sensor (e.g., one of sensors 202), as shown in block 1002. The vehicle state data may include GPS data, optical-based data, or the like. The vehicle control data may be in the form of input signals transmitted from a controller operated by a user. The input signals may include a correction component.

Dynamic parameters of the autonomous or semi-autonomous device 100 may then be determined based on at least one of the vehicle inertia data, vehicle state data, and vehicle control data, as shown in block 1004. The dynamic parameters may include at least one of position, orientation, velocity, angular velocity, acceleration, rotational acceleration, force, and torque of the autonomous or semi-autonomous device 100. If the GPS data or vehicle control data is incorrect, incomplete, or unavailable, a weight of dynamic parameters associated with the vehicle inertia data may be increased. More generally, a weight of dynamic parameters of at least one of the vehicle inertia data, optical-based data, GPS data, and vehicle control data/input signals may be increased if one of the vehicle inertia data, optical-based data, GPS data, and vehicle control data/input signals is incorrect, incomplete, or unavailable.

At least one of errors and noise associated with the dynamic parameters may then be determined, as shown in block 1006. The errors may at least partially correspond to the correction component.

The dynamic parameters may then be incorporated into geometric algebra multivectors, as shown in block 1008. The multivectors and a plurality of scalars may be encoded in dual form so as to yield a weighted sum for a moment of inertia of the autonomous or semi-autonomous device 100 such that rotations and translations of the autonomous or semi-autonomous device 100 are combined in a single variable. In one embodiment, the multivectors may not include all blades of the geometric algebra.

In one embodiment, a dynamic parameter of one of the multivectors includes orientation of the autonomous or semi-autonomous device 100 and at least one of an estimated error and an estimated noise of the orientation dynamic parameter. A dynamic parameter of another one of the multivectors includes angular velocity of the autonomous or semi-autonomous device 100 and at least one of an estimated error and an estimated noise of the angular velocity dynamic parameter.

In another embodiment, a dynamic parameter of one of the multivectors includes position and orientation of the autonomous or semi-autonomous device 100 and at least one of estimated errors and estimated noise of the position and orientation dynamic parameter. A dynamic parameter of another one of the multivectors includes velocity and angular velocity of the autonomous or semi-autonomous device 100 and at least one of estimated errors and estimated noise of the velocity and angular velocity dynamic parameter.

At least one of the errors and noise may then be propagated into the geometric algebra multivectors, as shown in block 1010.

A movement control decision may then be calculated via the geometric algebra multivectors, as shown in block 1012.

A movement control instruction signal may then be generated based on the movement control decision, as shown in block 1014.

The autonomous or semi-autonomous device 100 may then be controlled according to the movement control decision, as shown in block 1016. That is, the movement control instruction signal may be sent to the propulsion system 104 and/or the effectors 106 so as to affect the movement control decision.

Persistent errors associated with the dynamic parameters may then be determined, as shown in block 1018. The persistent errors may correspond to a persistent correction component.

The persistent errors may then be normalized into the dynamic parameters, as shown in block 1020.

The dynamic parameters including the normalized persistent errors may then be incorporated into the geometric algebra multivectors so as to form refined geometric algebra multivectors, as shown in block 1022.

Additional movement control decisions may be calculated via the refined geometric algebra multivectors, as shown in block 1024.

An additional movement control instruction signals may be generated based on the additional movement control decision, as shown in block 1026.

The autonomous or semi-autonomous device 100 may be controlled according to the additional movement control decisions, as shown in block 1028.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method of controlling a vehicle having a chassis, a plurality of sensors, a propulsion system, and a processor, the method comprising:

receiving sensor-based vehicle state data from the plurality of sensors, the sensor-based vehicle state data having embedded information;

determining dynamic parameters of the vehicle according to the sensor-based vehicle state data;

combining the sensor-based vehicle state data in a non-optimized form into a unified spatial model representation of the vehicle and its surrounding environment by mapping the dynamic parameters into a single geometric algebraic space via geometric multivectors;

optimizing select portions of the sensor-based vehicle state data by evaluating embedded information of the select portions of the sensor-based vehicle state data as the embedded information of the select portions of the sensor-based vehicle state data is required;

calculating a movement control decision based on the unified spatial model;

generating a movement control instruction signal based on the movement control decision; and controlling movement of the vehicle by sending the movement control instruction signal to the propulsion system such that the propulsion system effects the movement control decision.

2. The method of claim 1, the plurality of sensors including an inertial measurement unit (IMU) configured to generate vehicle inertia data, the sensor-based vehicle state data including the vehicle inertia data.

3. The method of claim 1, the plurality of sensors including a proximity sensor configured to generate object proximity data, the sensor-based vehicle state data including the object proximity data.

4. The method of claim 1, the plurality of sensors including a camera configured to collect optical data near the vehicle, the sensor-based vehicle state data including the optical data.

5. The method of claim 1, the vehicle further comprising an optical flow system configured to generate optical flow data, the method further comprising the step of combining the optical flow data in a non-optimized form into the unified spatial model representation of the vehicle and its surrounding environment.

6. The method of claim 1, further comprising the step of maintaining a fixed world reference frame, a dynamic vehicle reference frame, and multi-dimensional flight parameters.

7. The method of claim 1, wherein the optimizing step includes:

determining at least one of errors and noise associated with the select portions of the sensor-based vehicle state data; and assigning confidence levels to the dynamic parameters based on the at least one of errors and noise associated with the select portions of the sensor-based vehicle state data.

8. The method of claim 1, further comprising the step of parameterizing the sensor-based vehicle state data over time.

9. The method of claim 1, wherein each of the plurality of sensors is associated with a sensor channel, the method further comprising the step of generating a frequency-based confidence profile for each sensor channel via a continuously updated frequency domain transfer.

10. The method of claim 1, further comprising the steps of:

receiving vehicle control data corresponding to inputs of an operator, the vehicle control data including embedded information;

determining additional dynamic parameters of the vehicle according to the vehicle control data;

combining the vehicle control data in a non-optimized form into the unified spatial model representation of the vehicle and its surrounding environment by mapping the additional dynamic parameters into the single geometric algebraic space via geometric multivectors such that the operator inputs are incorporated into the unified spatial model as another form of sensor input; and optimizing select portions of the vehicle control data by evaluating embedded information of the select portions of the vehicle control data as the embedded information of the select portions of the vehicle control data is required.

11. The method of claim 10, wherein the vehicle control data optimizing step includes:
determining at least one of errors and noise associated with the select portions of the vehicle control data; and
assigning confidence levels to the additional dynamic parameters based on the at least one of errors and noise associated with the select portions of the vehicle control data.

12. The method of claim 10, wherein the operator is a human.

13. The method of claim 10, wherein the operator is an autonomous or semi-autonomous computational system.

14. A vehicle comprising:
a propulsion system for propelling the vehicle;
a plurality of sensors configured to generate sensor-based vehicle state data; and
a processor configured to:
determine dynamic parameters of the vehicle according to the sensor-based vehicle state data;
combine the sensor-based vehicle state data in a non-optimized form into a unified spatial model representation of the vehicle and its surrounding environment by mapping the dynamic parameters into a single geometric algebraic space via geometric multivectors;
optimize select portions of the sensor-based vehicle state data by evaluating embedded information of the select portions of the sensor-based vehicle state data as the select portions of the embedded information is required;
calculate a movement control decision based on the unified spatial model;
generate a movement control instruction signal based on the movement control decision; and
control movement of the vehicle by sending the movement control instruction signal to the propulsion system such that the propulsion system effects the movement control decision.

15. The vehicle of claim 14, the plurality of sensors including an inertial measurement unit (IMU) configured to generate vehicle inertia data, the sensor-based vehicle state data including the vehicle inertia data.

16. The vehicle of claim 14, the plurality of sensors including a proximity sensor configured to generate object proximity data, the sensor-based vehicle state data including the object proximity data.

17. The vehicle of claim 14, the plurality of sensors including a camera configured to collect optical data near the vehicle, the sensor-based vehicle state data including the optical data.

18. The vehicle of claim 14, further comprising an optical flow system configured to generate optical flow data, the processor being further configured to combine the optical flow data in a non-optimized form into the unified spatial model representation of the vehicle and its surrounding environment.

19. The vehicle of claim 14, wherein the processor is configured to maintain a fixed world reference frame, a dynamic vehicle reference frame, and multi-dimensional flight parameters.

20. The vehicle of claim 14, wherein the processor is further configured to:
determine at least one of errors and noise associated with the select portions of the sensor-based vehicle state data; and
assign confidence levels to the dynamic parameters based on the at least one of errors and noise associated with the select portions of the sensor-based vehicle state data.

21. The vehicle of claim 14, wherein the processor is further configured to parameterize the sensor-based vehicle state data over time.

22. The vehicle of claim 14, wherein the vehicle is one of an on-the-ground, in-air, on-water, underwater, underground, and in-space vehicle.

23. The vehicle of claim 14, wherein the processor is further configured to:
receive vehicle control data corresponding to operator inputs, the vehicle control data including embedded information;
determine additional dynamic parameters of the vehicle according to the vehicle control data;
combine the vehicle control data in a non-optimized form into the unified spatial model representation of the vehicle and its surrounding environment by mapping the additional dynamic parameters into the single geometric algebraic space via geometric multivectors such that the operator inputs are incorporated into the unified spatial model as another form of sensor input; and
optimize select portions of the vehicle control data by evaluating embedded information of the select portions of the vehicle control data as the embedded information of the select portions of the vehicle control data is required.

24. The vehicle of claim 23, wherein the processor is further configured to: determine at least one of errors and noise associated with the select portions of the vehicle control data; and
assign confidence levels to the additional dynamic parameters based on the at least one of errors and noise associated with the select portions of the vehicle control data.

25. A vehicle comprising:
a propulsion system for propelling the vehicle;
a plurality of sensors configured to generate sensor-based vehicle state data, the plurality of sensors including:
an inertial measurement unit (IMU) configured to generate vehicle inertia data,
a proximity sensor configured to generate object proximity data, and
a camera configured to collect optical data near the vehicle,
the sensor-based vehicle state data including the vehicle inertia data, the object proximity data, and the optical data;
an optical flow system configured to generate optical flow data;
a transceiver configured to receive vehicle control data, the vehicle control data corresponding to operator inputs, the sensor-based vehicle state data, the vehicle control data, and the optical flow data having embedded information; and
a processor configured to:
receive the vehicle control data via the transceiver;
determine dynamic parameters of the vehicle according to the sensor-based vehicle state data, the vehicle control data, and the optical flow data over time;
combine the sensor-based vehicle state data, the vehicle control data, and the optical flow data in a non-optimized form into a unified spatial model representation of the vehicle and its surrounding environment by mapping the dynamic parameters into a single geometric algebraic space via geometric multivectors;

optimize select portions of the sensor-based vehicle state data, vehicle control data, and optical flow data by evaluating embedded information of the select portions of the sensor-based vehicle state data, vehicle control data, and optical flow data as the embedded information of the select portions of the sensor-based vehicle state data, vehicle control data, and optical flow data is required, the optimization including:

determining at least one of errors and noise associated with the select portions of the sensor-based vehicle state data, vehicle control data, and optical flow data; and assigning confidence levels to the dynamic parameters based on the at least one of errors and noise associated with the select portions of the sensor-based vehicle state data, vehicle control data, and optical flow data;

maintain a fixed world reference frame, a dynamic vehicle reference frame, and a multi-dimensional flight parameters via the dynamic parameters;

calculate a movement control decision based on the unified spatial model;

generate a movement control instruction signal based on the movement control decision; and control movement of the vehicle by sending the movement control instruction signal to the propulsion system such that the propulsion system effects the movement control decision.

* * * * *